US012705507B2

(12) United States Patent
Wang et al.

(10) Patent No.: US 12,705,507 B2
(45) Date of Patent: Aug. 11, 2026

(54) METHOD FOR OBTAINING USER PORTRAIT AND RELATED APPARATUS

(71) Applicant: TENCENT TECHNOLOGY (SHENZHEN) COMPANY LIMITED, Shenzhen (CN)

(72) Inventors: Weijia Wang, Shenzhen (CN); Xin Chen, Shenzhen (CN); Su Yan, Shenzhen (CN); Xu Zhang, Shenzhen (CN); Leyu Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 815 days.

(21) Appl. No.: 17/898,270

(22) Filed: Aug. 29, 2022

(65) Prior Publication Data

US 2022/0405607 A1 Dec. 22, 2022

Related U.S. Application Data

(63) Continuation of application No. PCT/CN2021/102604, filed on Jun. 28, 2021.

(30) Foreign Application Priority Data

Aug. 14, 2020 (CN) ......................... 202010820059.0

(51) Int. Cl.
*G06N 5/022* (2023.01)

(52) U.S. Cl.
CPC .................................... *G06N 5/022* (2013.01)

(58) Field of Classification Search
CPC .... G06F 16/9535; G06F 18/214; G06F 18/22; G06F 18/253
See application file for complete search history.

(56) References Cited

U.S. PATENT DOCUMENTS

| | | | | |
|---|---|---|---|---|
| 10,496,924 | B1 | 12/2019 | Highnam et al. | |
| 11,113,745 | B1 * | 9/2021 | Cetintas | G06N 20/00 |
| 11,797,530 | B1 * | 10/2023 | Bouyarmane | G06N 3/045 |
| 2017/0132230 | A1 * | 5/2017 | Muralidhar | G06F 16/9535 |
| 2018/0336490 | A1 * | 11/2018 | Gao | G06N 20/00 |

(Continued)

FOREIGN PATENT DOCUMENTS

| | | | |
|---|---|---|---|
| CN | 105574159 | A | 5/2016 |
| CN | 107423442 | A | 12/2017 |

(Continued)

OTHER PUBLICATIONS

Agrawal et al., "Tag Embedding Based Personalized Point of Interest Recommendation System," in arXiv preprint arXiv:2004.06389 (2020). (Year: 2020).*

(Continued)

*Primary Examiner* — Ryan C Vaughn
(74) *Attorney, Agent, or Firm* — Anova Law Group, PLLC

(57) ABSTRACT

A method for obtaining a user portrait includes: obtaining a user feature vector of a target user and tag feature vectors of content tags of multimedia content in a target application, and determining an alternative tag of the target user according to similarities between the user feature vector and the tag feature vectors, to further determine a user portrait of the target user according to the alternative tag.

18 Claims, 15 Drawing Sheets

(56) References Cited

U.S. PATENT DOCUMENTS

| | | | | |
|---|---|---|---|---|
| 2020/0118042 | A1 | 4/2020 | Wang et al. | |
| 2020/0381098 | A1* | 12/2020 | Edwards | G16H 40/67 |
| 2021/0280311 | A1* | 9/2021 | Naik | G06N 5/04 |

FOREIGN PATENT DOCUMENTS

| | | | |
|---|---|---|---|
| CN | 108268547 | A | 7/2018 |
| CN | 109753994 | A | 5/2019 |
| CN | 110097394 | A | 8/2019 |
| CN | 110297848 | A | 10/2019 |
| CN | 110489639 | A | 11/2019 |
| CN | 110598011 | A | 12/2019 |
| CN | 110727860 | A | 1/2020 |
| CN | 110781930 | A | 2/2020 |
| CN | 111191092 | A | 5/2020 |
| CN | 111192025 | A | 5/2020 |
| CN | 111444428 | A | 7/2020 |
| CN | 111898031 | A | 11/2020 |

OTHER PUBLICATIONS

Yan et al., “Learning to Build User-tag Profile in Recommendation System,” in Proc. 29th Ann. Conf. Info. & Knowledge Mgmt. 2877-84 (2020). (Year: 2020).*

The World Intellectual Property Organization (WIPO) International Search Report for PCT/CN2021/102604 Sep. 27, 2021 6 Pages (including translation).

The State Intellectual Property Office of the People’s Republic of China (SIPO) Office Action 1 for 202010820059.0 Dec. 26, 2023 9 Pages (including translation).

* cited by examiner

METHOD FOR OBTAINING USER PORTRAIT AND RELATED APPARATUS

RELATED APPLICATION(S)

This application is a continuation application of PCT/CN2021/102604 filed on Jun. 28, 2021, which claims priority to Chinese Patent Application No. 202010820059.0, entitled "METHOD FOR OBTAINING USER PORTRAIT AND RELATED APPARATUS" filed with the Patent Office of China on Aug. 14, 2020, all of which are incorporated herein by reference in entirety.

FIELD OF THE TECHNOLOGY

The present disclosure relates to the field of computers, and in particular, to user portrait technologies.

BACKGROUND

The personalized recommendation system is one of core technologies of the Internet, which recommends interesting content for users based on behaviors and interest of the users. A user portrait refers to structuring and tagging of user information, and describing and analyzing data of the users by describing data of various dimensions such as population attributes, social attributes, and interest preferences of the users, to mine the potential value, thereby better improving the effect of personalized recommendation.

During user portrait construction, portrait tags may be extracted from user behavior data, simple statistical processing is performed on portrait tags involved in the user behavior data, portrait tags of each user are scored according to the frequency, that is, a higher frequency indicating a higher score, and the user portrait is obtained according to scores of the portrait tags. For a cold-start user, the accuracy of a user portrait obtained based on portrait tag statistics is relatively low due to a small amount of user behavior data, affecting accuracy of related services performed based on the user portrait.

SUMMARY

Embodiments of the present disclosure provide a method for obtaining a user portrait and a related apparatus, to improve the accuracy of an obtained user portrait, and further improve the precision of content recommendation.

In one aspect, the present disclosure provides a method for obtaining a user portrait, the method including: determining a user feature vector of a target user according to attribute information and historical behavior data of the target user; obtaining tag feature vectors of content tags of multimedia content in a target application; determining an alternative tag of the target user from the content tags of the multimedia content according to similarities between the user feature vector and the tag feature vectors; and determining a user portrait of the target user based on the alternative tag of the target user.

In another aspect, the present disclosure provides a method for training a user portrait model, the method including: obtaining the user portrait model by using a to-be-trained user portrait model and a training sample, the training sample including sample multimedia content and user features of a sample user, the user portrait model being obtained by: extracting feature vectors of the user features of the sample user and tag feature vectors of content tags of the sample multimedia content; performing hierarchical embedding processing on the feature vectors of the user features of the sample user, to obtain a user feature vector of the sample user; performing hierarchical embedding processing on the tag feature vectors, to obtain a content feature vector of the sample multimedia content; and adjusting a parameter of the to-be-trained user portrait model based on a degree of association between the user feature vector and the content feature vector.

In yet another aspect, the present disclosure provides an apparatus for obtaining a user portrait, the apparatus including: a memory storing computer program instructions; and a processor coupled to the memory and configured to execute the computer program instructions and perform: determining a user feature vector of a target user according to attribute information and historical behavior data of the target user; obtaining tag feature vectors of content tags of multimedia content in a target application; determining an alternative tag of the target user from the content tags of the multimedia content according to similarities between the user feature vector and the tag feature vectors; and determining a user portrait of the target user based on the alternative tag of the target user.

In yet another aspect, the present disclosure provides an apparatus for training a user portrait model, the apparatus including: a memory storing computer program instructions; and a processor coupled to the memory and configured to execute the computer program instructions and perform: obtaining the user portrait model by using a to-be-trained user portrait model and a training sample, to obtain a user portrait model, the training sample including sample multimedia content and user features of a sample user, the user portrait model being obtained by: extracting feature vectors of the user features of the sample user and tag feature vectors of content tags of the sample multimedia content; performing hierarchical embedding processing on the feature vectors of the user features of the sample user, to obtain a user feature vector of the sample user; performing hierarchical embedding processing on the tag feature vectors, to obtain a content feature vector of the sample multimedia content; and adjusting a parameter of the to-be-trained user portrait model based on a degree of association between the user feature vector and the content feature vector.

In yet another aspect, the present disclosure provides a computer-readable storage medium, storing a computer program executable by a computing device, the program, when run on the computing device, causing the computing device to perform operations of the method for obtaining a user portrait, or operations of the method for training a user portrait model.

In certain embodiment(s) of the present disclosure, a user feature vector of a target user is determined according to attribute information and historical behavior data of the target user. The user feature vector not only represents a historical behavior and an attribute of a user, but also represents user preferences determined based on the historical behavior and the attribute of the user. Therefore, compared with a user portrait obtained based on tag statistics, an alternative tag of a target user determined according to similarities between a user feature vector and tag feature vectors of the target user can better represent the user preferences, thereby improving the accuracy of the obtained user portrait. In addition, when or in response to determining that the alternative tag is obtained by matching the user feature vector and the tag feature vector, the alternative tag may not only be a tag in the historical behavior data of the target user, but also a tag other than the historical behavior data, to improve a generalization capability and expand interest of the target user, so that the obtained user portrait may be more comprehensive and accurate, thereby improving the accuracy of content recommendation.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
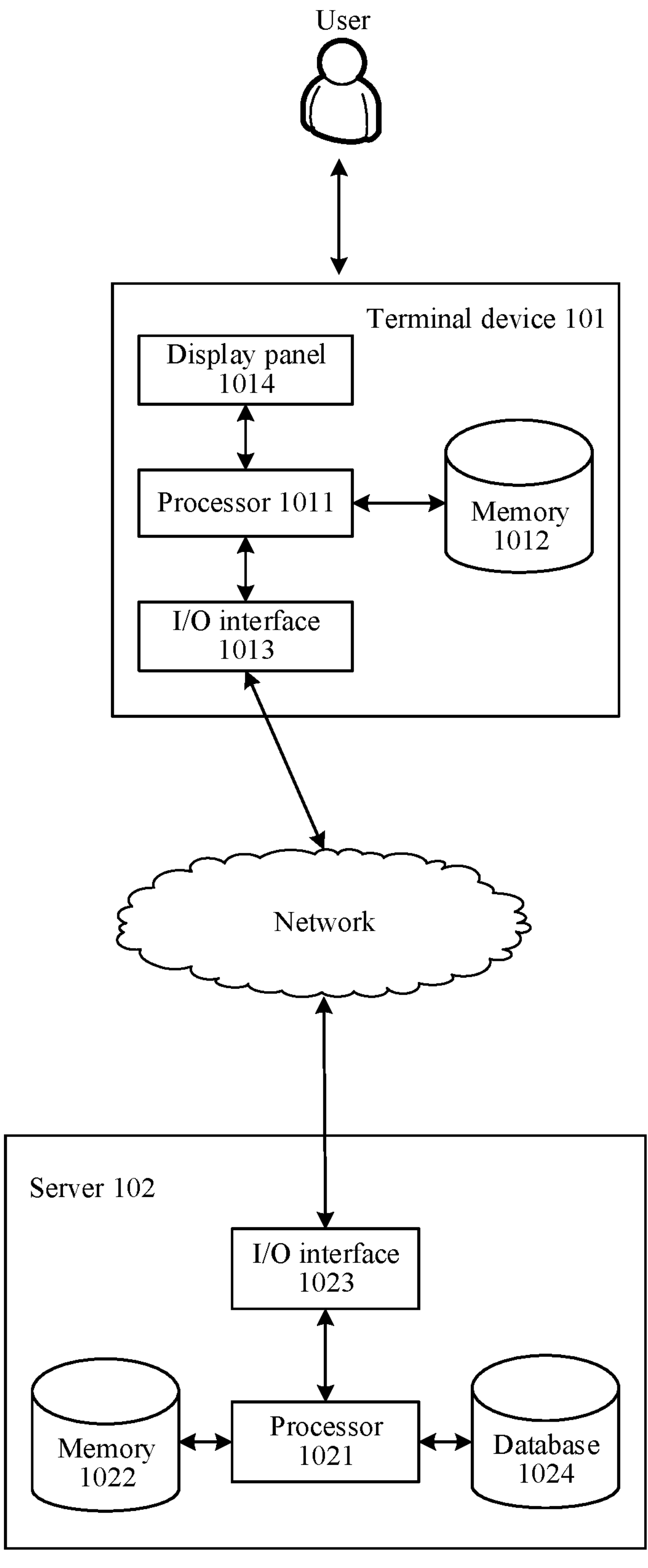
FIG. 1 is a schematic architectural diagram of a system according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

For ease of understanding, the following explains terms in the embodiments of the present invention.

In this embodiment of the present disclosure, a user feature vector of a target user and tag feature vectors of content tags of multimedia content in a target application are determined by using an artificial intelligence technology, and an alternative tag of the target user is determined according to the user feature vector and the tag feature vectors of the content tags of the multimedia content, to further determine a user portrait of the target user according to the alternative tag.

In this embodiment of the present disclosure, the user feature vector of the target user and the tag feature vectors of the content tags of the multimedia content in the target application are determined by using a specific machine learning model or algorithm in the artificial intelligence technology. Attention mechanism: It imitates an internal process of a biological observation behavior, that is, a mechanism that aligns internal experience with external feeling to increase the observation fineness of some regions, which is simply to quickly select high-value information from a large amount of information. The attention mechanism has two main aspects: deciding which part of an input is to be paid attention to; and allocating the limited information processing resources to the important part. In a neural network, based on the attention mechanism, the neural network can focus on an input (or feature) subset thereof and select a specific input. In this embodiment of the present disclosure, user features of the target user in a plurality of feature fields are fused based on the attention mechanism, to determine a user feature vector of the target user.

User portrait: The target user portrait is a tagged user model abstracted according to information of the user such as social attributes, living habits, and consumption behavior. The core work of constructing the user portrait is to apply a "tag" for the user, and the tag is a highly refined feature identifier derived from the analysis of user information.

The following describes a design idea involved in the embodiments of the present disclosure.

During user portrait construction, portrait tags are first extracted from user behavior data, statistical processing is simply performed on portrait tags involved in the user behavior data, portrait tags of each user are scored according to the frequency, that is, a higher frequency indicating a higher score, and the user portrait is obtained according to scores of the portrait tags. For a cold-start user, since there is a relatively small amount of user behavior data, and a portrait tag of a user may only appear once or twice, when or in response to determining that a portrait is scored based on a frequency that the portrait tag appears, scores of the portrait tag are not representative, and as a result, the accuracy of a user portrait obtained based on scoring the portrait tag is low, and user tags other than the user behavior data cannot be obtained. Consequently, when or in response to determining that content is recommended to the user based on the user portrait, content that users don't like may be recommended, affecting user experience.

Considering that the user preferences may be reflected in the attribute information and behavior data of the user, the user preferences may be better represented by the user feature obtained by combining the attribute information and the behavior data of the user, and when or in response to determining that user tags are matched based on the user features, the obtained user tags are related to the user preferences and are not limited to tags in existing behavior data of the user. In view of this, an embodiment of the present disclosure provides a method for obtaining a user portrait, the method including: determining a user feature vector of a target user according to attribute information and historical behavior data of the target user, and obtaining tag feature vectors of content tags of multimedia content in a target application; determining an alternative tag of the target user from the content tags of the multimedia content according to similarities between the user feature vector and the tag feature vectors; and determining a user portrait of the target user based on the alternative tag of the target user.

Compared with obtaining a user portrait based on tag statistics, in the method for obtaining a user portrait provided in the present disclosure, the user feature vector can represent the user preferences more comprehensively, thereby improving the accuracy of obtained user tags, and improving the accuracy of the obtained user portrait. In addition, the obtained alternative tag may not only be a tag in the historical behavior data of the target user, but also a tag other than the historical behavior data, to improve a generalization capability and expand interest of the target user, so that the obtained user portrait may be more comprehensive and accurate, thereby improving the accuracy of content recommendation.

After a design idea of the embodiments of the present disclosure is described, the following briefly describes implementation scenarios to which the technical solutions in this embodiment of the present disclosure are applicable. The implementation scenarios described below are merely used for describing rather than limiting the embodiments of the present disclosure. During specific implementation, the technical solutions provided in the embodiments of the present disclosure are flexibly applicable according to any practical implementation.

Scenario 1: Document Recommendation

Using an example in which multimedia content is a document, when or in response to determining that a document is recommended to a target user, a content recommendation device first acquires attribute information and historical behavior data of the target user, where the attribute information of the target user includes gender, age, place, and the like, and the historical behavior data includes historical behavior data of the target user in a target application and/or historical behavior data of the target user in another application other than the target application, for example, a subject of a document, a document category, a content tag included in the document clicked by the target user in the target application and/or another application other than the target application. Tag feature vectors of content tags of a plurality of documents in the target application are obtained, an alternative tag of the target user is determined from the content tags of the plurality of documents according to similarities between a user feature vector of the target user and the tag feature vectors, and a user portrait of the target user is determined based on the alternative tag of the target user. Then, the document in the target application is recommended to the target user according to the user portrait.

Scenario 2: Advertisement Recommendation

Using an example in which multimedia content is an advertisement, when or in response to determining that an advertisement is recommended to a target user, a content recommendation device first acquires attribute information and historical behavior data of the target user, where the attribute information of the target user includes gender, age, place, and the like, and the historical behavior data includes historical behavior data of the target user in a target application and/or historical behavior data of the target user in another application other than the target application, for example, a topic of an advertisement, an advertisement category, a content tag included in the advertisement clicked by the target user in the target application and/or another application other than the target application. Tag feature vectors of content tags of a plurality of advertisements in the target application are obtained, an alternative tag of the target user is determined from the content tags of the plurality of advertisements according to the similarities between the user feature vector of the target user and the tag feature vectors, and a user portrait of the target user is determined based on the alternative tag of the target user. Then, the advertisement in the target application is recommended to the target user according to the user portrait.

The method for obtaining a user portrait provided in this embodiment of the present disclosure is not limited to be applied to the two implementation scenarios, but can also be applied to a content recommendation scenario such as audio recommendation, video recommendation, commodity recommendation, take-out information recommendation, reading recommendation, news recommendation, or content recommendation in a mini program. This is not limited in the present disclosure.

FIG. 1 is a system architecture diagram of a method for obtaining a user portrait according to an embodiment of the present disclosure. The architecture includes at least a terminal device 101 and a server 102.

A target application may be installed in the terminal device 101. The target application may be a client application, a web application, a mini program application, and the like. The attribute information of the target user may be obtained from registration information of the target user in the target application, and the historical behavior data of the target user may be obtained from historical records of the target application and/or another application other than the target application. The terminal device 101 may include one or more processors 1011, a memory 1012, an I/O interface 1013 to a buried server 103, a display panel 1014, and the like. The terminal device 101 may be a smartphone, a tablet computer, a notebook computer, a desktop computer, a smart speaker, a smartwatch, or the like, but is not limited thereto.

The server 102 may be a background server of the target application, providing corresponding services for the target application. The server 102 may include one or more processors 1021, a memory 1022, an I/O interface 1023 to the terminal device 101, and the like. In addition, the server 102 may further be configured with a database 1024. The server 102 may be an independent physical server, or may be a server cluster or a distributed system formed by a plurality of physical servers, or may be a cloud server that provides cloud computing services such as a cloud service, a cloud database, cloud computing, a cloud function, cloud storage, a network service, cloud communication, a middleware service, a domain name service, a security service, a content delivery network (CDN), big data, and an AI platform. The terminal device 101 and the server 102 may be directly or indirectly connected in a wired or wireless communication manner. This is not limited in the present disclosure.

An apparatus for obtaining a user portrait may be the terminal device 101 or may be the server 102.

In certain embodiment(s), the apparatus for obtaining a user portrait is the terminal device 101.

The terminal device 101 obtains attribute information and historical behavior data of a target user from the server 102, and determines a user feature vector of the target user according to the attribute information and the historical behavior data of the target user. The terminal device 101 obtains tag feature vectors of content tags of multimedia content in a target application, and determines an alternative tag of the target user from the content tags of the multimedia content according to similarities between a user feature vector of the target user and tag feature vectors. Then, a user portrait of the target user is determined based on the alternative tag of the target user. When or in response to determining that the target user triggers content recommendation in the target application installed in the terminal device 101, the target application obtains multimedia content recommended to the target user from the server 102 according to the user portrait of the target user and displays the multimedia content.

In certain embodiment(s), the apparatus for obtaining a user portrait is the server 102.

The server 102 determines a user feature vector of a target user according to attribute information and historical behavior data of the target user, and obtains tag feature vectors of content tags of multimedia content in a target application; then, the server 102 determines an alternative tag of the target user from the content tags of the multimedia content according to similarities between the user feature vector of the target user and the tag feature vectors. Then, a user portrait of the target user is determined based on the alternative tag of the target user. When or in response to determining that the target user triggers content recommendation in the target application installed in the terminal device 101, the target application sends a content recommendation request to the server 102 through the terminal device 101. The server 102 obtains multimedia content recommended to the target user from a database according to the user portrait of the target user and sends the multimedia content recommended to the target user to the terminal device 101, and the terminal device 101 displays the multimedia content recommended to the target user in the target application.

Figure 2:
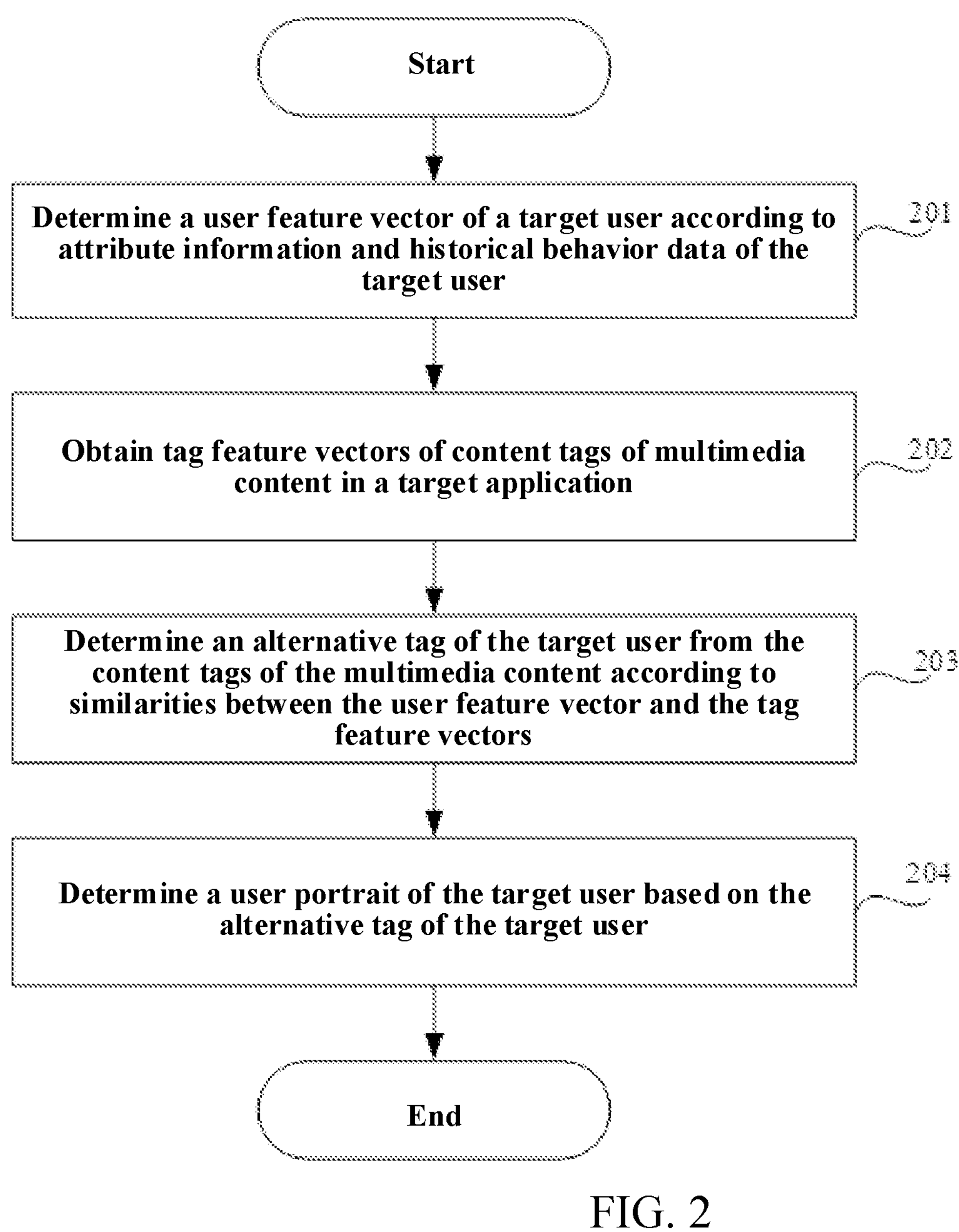
FIG. 2 is a schematic flowchart of a method for obtaining a user portrait according to embodiment(s) of the present disclosure.

Based on the system architecture diagram shown in FIG. 1, this embodiment of the present disclosure provides a process of a method for obtaining a user portrait. As shown in FIG. 2, the process of the method may be performed by a computing device, where the computing device may be the terminal device 101 or the server 102 shown in FIG. 1, and the process includes the following steps:

Step 201: Determine a user feature vector of a target user according to attribute information and historical behavior data of the target user.

The attribute information of the target user may be obtained from registration information of the target user in the target application, and the attribute information of the target user includes at least two types of information:

The first category is numerical information, that is, information described by numbers, such as age, date of birth, account registration time, and the like.

The second category is text information, that is, information described by text, for example, the gender may be male or female, and the location may be Beijing, Shanghai, and the like.

The historical behavior data of the target user includes historical behavior data of the target user in the target application and/or historical behavior data of the target user in another application other than the target application. Behavior data include an operation event and attribute information of an operation object. The operation event may be clicking, browsing, favoriting, commenting, and the like. The attribute information of the operation object may be a topic, a category, a tag, and the like.

Step 202: Obtain tag feature vectors of content tags of multimedia content in a target application.

The multimedia content may be text information, audio, video, and the like. One piece of multimedia content may correspond to one or more content tags. For example, content tags corresponding to a news article about a football match include: sports, football, XX football team, and the like. In this embodiment, there may be one or more pieces of multimedia content. This is not limited in this embodiment.

Step 203: Determine an alternative tag of the target user from the content tags of the multimedia content according to similarities between the user feature vector and the tag feature vectors.

In certain embodiment(s), a similarity threshold may be preset, similarities between the user feature vector of the target user and the tag feature vectors are determined, a tag feature vector whose similarity is greater than the similarity threshold as a matching tag vector, and a content tag corresponding to the matching tag vector as the alternative tag of the target user.

Alternatively, an alternative tag quantity threshold may be preset, similarities between the user feature vector of the target user and the tag feature vectors are determined, the similarities are sorted in descending order of the similarity, and content tags corresponding to tag feature vectors sorted top P are determined as the alternative tags of the target user, where P is the alternative tag quantity threshold.

The multimedia content used in this embodiment may be all multimedia content in the target application, or may be part of multimedia content in the target application.

Step 204: Determine a user portrait of the target user based on the alternative tag of the target user.

The repeated tags may be removed when or in response to determining that there is a repeated tag in the alternative tags of the target user, or there is a repeated tag between the alternative tags of the target user and existing tags owned by the target user.

In addition, an upper limit of a quantity of tags may be preset. When or in response to determining that a sum of the alternative tags of the target user and the existing tags owned by the target user is greater than the upper limit, the alternative tags and the existing tags owned by the target user may be sorted in descending order according to the similarities between the user feature vector of the target user and the tag feature vectors, and tags sorted top N are retained, where N is the upper limit of the quantity of tags.

Alternatively, statistics on the frequency that each tag appears before deduplication may be collected, the alternative tags and the existing tags owned by the target user are sorted in descending order of the frequency, and tags sorted top N are retained, where N is the upper limit of the quantity of tags.

In this embodiment of the present disclosure, a user feature vector of a target user and tag feature vectors of content tags of multimedia content in a target application are obtained, and alternative tags of the target user are determined according to similarities between the user feature vector and the tag feature vectors, to further determine a user portrait of the target user according to the alternative tags. Compared with obtaining a user portrait based on tag statistics, in the method for obtaining a user portrait provided in the present disclosure, the user feature vector can represent the user preferences more comprehensively, thereby improving the accuracy of obtained user tags, and improving the accuracy of the obtained user portrait. In addition, the obtained alternative tag may not only be a tag in the historical behavior data of the target user, but also a tag other than the historical behavior data, to improve a generalization capability and expand interest of the target user, so that the obtained user portrait may be more comprehensive and accurate, thereby improving the accuracy of content recommendation.

In certain embodiment(s), In step 201, when the user feature vector of the target user is obtained, user features of the target user in a plurality of feature fields are first determined according to the attribute information and the historical behavior data of the target user, feature vectors of user features in each feature field are extracted and hierarchical embedding processing is performed on the feature vectors of the user features in each feature field through the user portrait model, to determine the user feature vector of the target user.

The feature field is a feature dimension representing user features. User features in various feature fields may be different or partially the same. The user feature may be attribute information such as gender, age, address, and position, or may be information such as a tag, a category, and a topic obtained from the historical behavior data. The user portrait model is obtained by training based on a degree of association between a user feature vector of a sample user and a content feature vector of sample multimedia content, the content feature vector of the sample multimedia content is obtained by performing hierarchical embedding processing on tag feature vectors of content tags of the sample multimedia content, and the user feature vector of the sample user is obtained by performing hierarchical embedding processing on feature vectors of user features of the sample user. Embedding processing is performed on the user features in each feature field through the user portrait model, to obtain the feature vectors of user features. The user portrait model may be a deep neural network (DNN) model, a transformer model, and the like.

Exemplarily, the attribute information of the target user includes gender, age, address and position. The historical behavior data of the target user are historical behavior data of the target user in another application other than the target application, and include historical behavior data of the target user in a video application A, historical behavior data of the target user in an audio application B, and historical behavior data of the target user in a shopping application C.

In a first implementation, seven feature fields are preset, namely, a first feature field to a seventh feature field, where the gender is a user feature in the first feature field, the age is a user feature in a second feature field, the address is a user feature in a third feature field, the position is a user feature in a fourth feature field, information such as a tag, a category, or a topic is obtained from the historical behavior data of the video application A as a user feature in a fifth feature field, information such as a tag, a category, or a topic is obtained from the historical behavior data of the audio application B as a user feature in a sixth feature field, and information such as a tag, a category, or a topic is obtained from the historical behavior data of the shopping application C as a user feature in the seventh feature field.

In a second implementation, five feature fields are preset, namely, a first feature field to a fifth feature field, where the gender is a user feature in the first feature field, the age is a user feature in a second feature field, the address is a user feature in a third feature field, the position is a user feature in a fourth feature field. Information such as a tag, a category, or a topic is obtained from the historical behavior data in the video application A, the historical behavior data in the audio application B, and the historical behavior data in the shopping application C as a user feature in the fifth feature field.

In a third implementation, four feature fields are preset, namely, a first feature field to a fourth feature field, where the gender, the age, the address, and the position are user features in the first feature field, a tag is obtained from the historical behavior data of the video application A as a user feature in a second feature field, information such as a tag, a category, or a topic is obtained from the historical behavior data of the audio application B as a user feature in a third feature field, and information such as information such as a tag, a category, or a topic is obtained from the historical behavior data of the shopping application C as a user feature in the fourth feature field.

In a fourth implementation, two feature fields are preset, namely, a first feature field and a second feature field, where the gender, the age, the address, and the position are user features in the first feature field, and information such as a tag, a category, or a topic are obtained from the historical behavior data in the video application A, the historical behavior data in the audio application B, and the historical behavior data in the shopping application C as a user feature in the second feature field.

Feature field division is not limited to the four implementations, and there may be another implementation. This is not limited in the present disclosure. In addition, when the user feature vector of the target user is obtained, the attribute information and the historical behavior data of the target user may also be directly extracted, to determine the user feature vector of the target user. This is not limited in the present disclosure.

In this embodiment of the present disclosure, user features of the target user in a plurality of feature fields are determined according to the attribute information and the historical behavior data of the target user, so that the user features are represented from a plurality of dimensions, thereby improving the accuracy of the user feature vector of the target user determined based on the user features.

In this embodiment of the present disclosure, after feature vectors of user features in each feature field are extracted, hierarchical embedding processing is performed on the feature vectors of the user features in each feature field, and during determination of the user feature vector of the target user, the present disclosure includes at least the following implementations:

In a first implementation, the feature vectors of the user features in each feature field are fused to obtain an intra-field feature vector of each feature field, and intra-field feature vectors of the plurality of feature fields are fused to obtain the user feature vector of the target user.

For example, weighted summation may be performed on the feature vectors of the user features in each feature field, to obtain the intra-field feature vector of each feature field, which is expressed by the following formula (1):

$$\vec{f_t} = \sum_x^H \alpha_x * \vec{t_x} \tag{1}$$

$\vec{f_t}$ is an intra-field feature vector of a feature field t, $\alpha_x$ is a weight of a feature vector $\vec{t_x}$ during intra-field fusion, and H is an upper limit of a quantity of feature vectors in a feature field, where upper limits of the quantity of feature vectors in different feature fields may be different.

The weight $\alpha_x$ of the feature vector $\vec{t_x}$ during the intra-field fusion may be obtained by using formula (2), which is expressed as follows:

$$\alpha_x = \frac{e^{\vec{u1} \cdot relu(\vec{t_x} \cdot W_t + \vec{b_t})}}{\sum_m^H e^{\vec{u1} \cdot relu(\vec{t_m} \cdot W_t + \vec{b_t})}} \tag{2}$$

$\alpha_x$ is a weight of a feature vector $\vec{t_x}$ during intra-field fusion, $\vec{u1}$ is a semantic vector during the intra-field fusion, $W_t$ is a space transformation matrix of a feature field t, and $\vec{b_t}$ is an offset vector. In a specific implementation, semantic vectors $\vec{u1}$ in feature fields may be the same or different. The space transformation matrix and the offset vector in each feature field are different, and the weight during the intra-field fusion is obtained by using an attention mechanism during training of the user portrait model.

Then, weighted summation is performed on intra-field feature vectors of the plurality of feature fields, to obtain the user feature vector of the target user, which is expressed by the following formula (3):

$$\vec{f} = \sum_t^N \beta_t * \vec{f_t} \tag{3}$$

$\vec{f}$ is a user feature vector of the target user, $\beta_t$ is a weight of an intra-field feature vector $\vec{f_t}$ during inter-field fusion, and N is a quantity of feature fields.

The weight $\beta_t$ of the intra-field feature vector $\vec{f_t}$ during the inter-field fusion may be obtained by using formula (4), which is expressed as follows:

$$\beta_t = \frac{e^{\vec{u2} \cdot relu(\vec{f_t} \cdot W_t + \vec{b_t})}}{\sum_m^N e^{\vec{u2} \cdot relu(\vec{f_m} \cdot W_t + \vec{b_t})}} \tag{4}$$

$\beta_t$ is a weight of an intra-field feature vector $\vec{f_t}$ during inter-field fusion, $\vec{u2}$ is a semantic vector during the inter-field fusion, $W_t$ is a space transformation matrix of a feature field t, and $\vec{b_t}$ is an offset vector. The weight during the inter-field fusion is obtained by using an attention mechanism during training of the user portrait model.

The method for performing intra-field fusion and inter-field fusion on the feature vectors of the user features is not limited to the weighted summation, and there is another method in which weighted summation is performed on one of the intra-field fusion and the inter-field fusion, and direct addition is performed on the other. This is not limited in the present disclosure.

Figure 3:
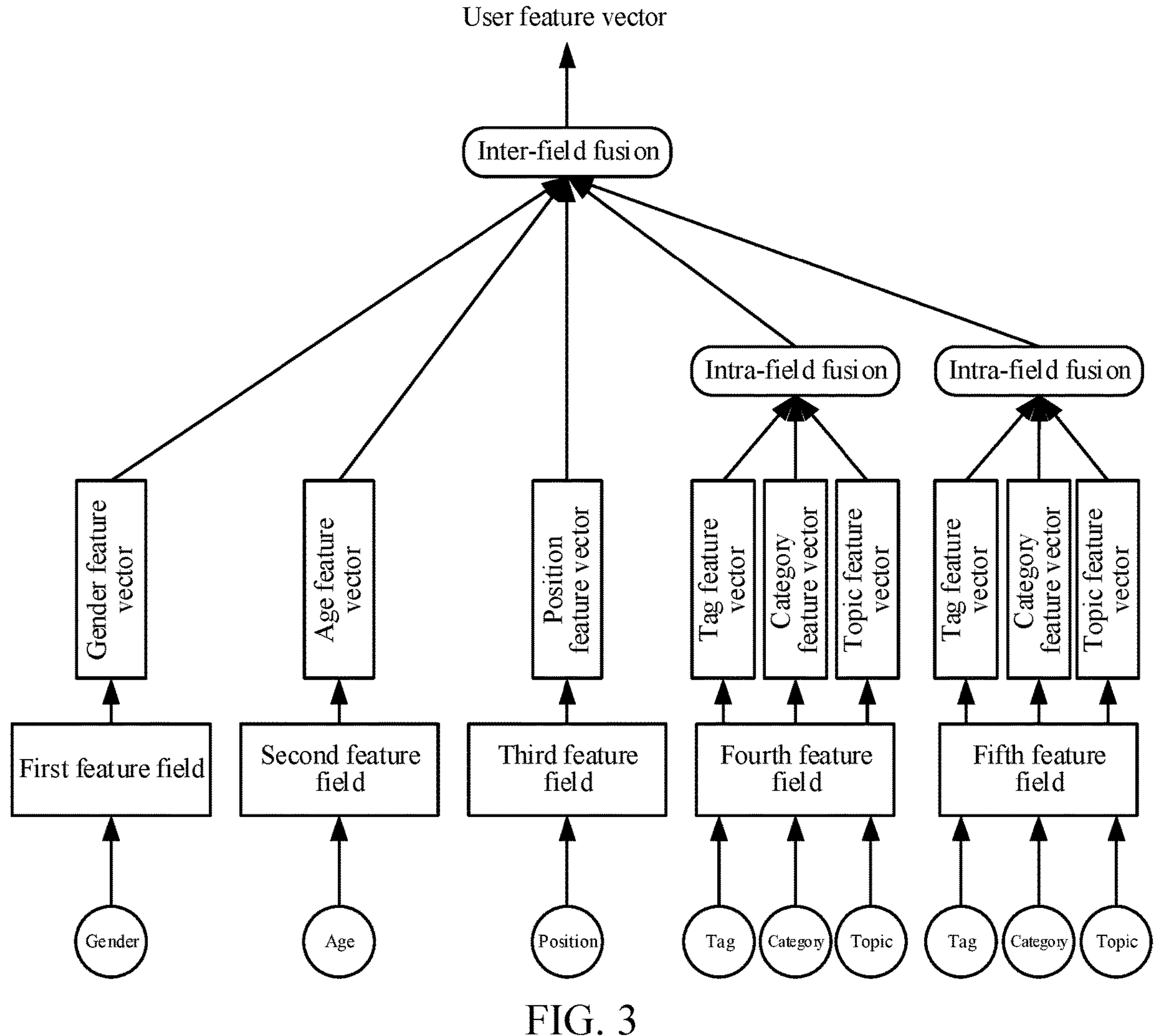
FIG. 3 is a schematic flowchart of a method for obtaining a user feature vector according to embodiment(s) of the present disclosure.

Exemplarily, as shown in FIG. 3, five feature fields are preset, namely, a first feature field to a fifth feature field, where the gender is a user feature in the first feature field, the age is a user feature in a second feature field, the position is a user feature in a third feature field, a tag, a category, and a topic are obtained from the historical behavior data of the video application A as user features in a fourth feature field, and a tag, a category, and a topic are obtained from the historical behavior data of the audio application B as user features in the fifth feature field.

Feature vectors of user features in each feature field are extracted, where the feature vector in the first feature field is a gender feature vector, the feature vector in the second feature field is an age feature vector, the feature vector in the third feature field is a position feature vector, the feature vectors in the fourth feature field include a tag feature vector, a category feature vector, and a topic feature vector, and the feature vectors in the fifth feature field include a tag feature vector, a category feature vector, and a topic feature vector.

Since the first feature field, the second feature field, and the third feature field only include one feature vector, intra-field fusion may not be performed. Weighted summation is performed on the tag feature vector, the category feature vector, and the topic feature vector in the fourth feature field by using the formula (1) to obtain an intra-field feature vector of the fourth feature field, and weighted summation is performed on the tag feature vector, the category feature vector, and the topic feature vector in the fifth feature field by using the formula (1) to obtain an intra-field feature vector of the fifth feature field.

Inter-field fusion is performed on the gender feature vector of the first feature field, the age feature vector of the second feature field, the position feature vector of the third feature field, the intra-field feature vector of the fourth feature field, and the intra-field feature vector of the fifth feature field by using the formula (2), to obtain the user feature vector of the target user.

In a second implementation, feature vectors of user features of the target user in a plurality of feature fields are fused, to obtain the user feature vector of the target user.

In certain embodiment(s), the feature vectors of the user features of the target user in the plurality of feature fields may be fused by performing weighted summation, to obtain the user feature vector of the target user. When weighted summation is performed, a weight of each feature vector may be obtained by using the attention mechanism during the training of the user portrait model. Alternatively, the feature vectors of the user features of the target user in the plurality of feature fields may be fused by performing direct addition, to obtain the user feature vector of the target user.

Figure 4:
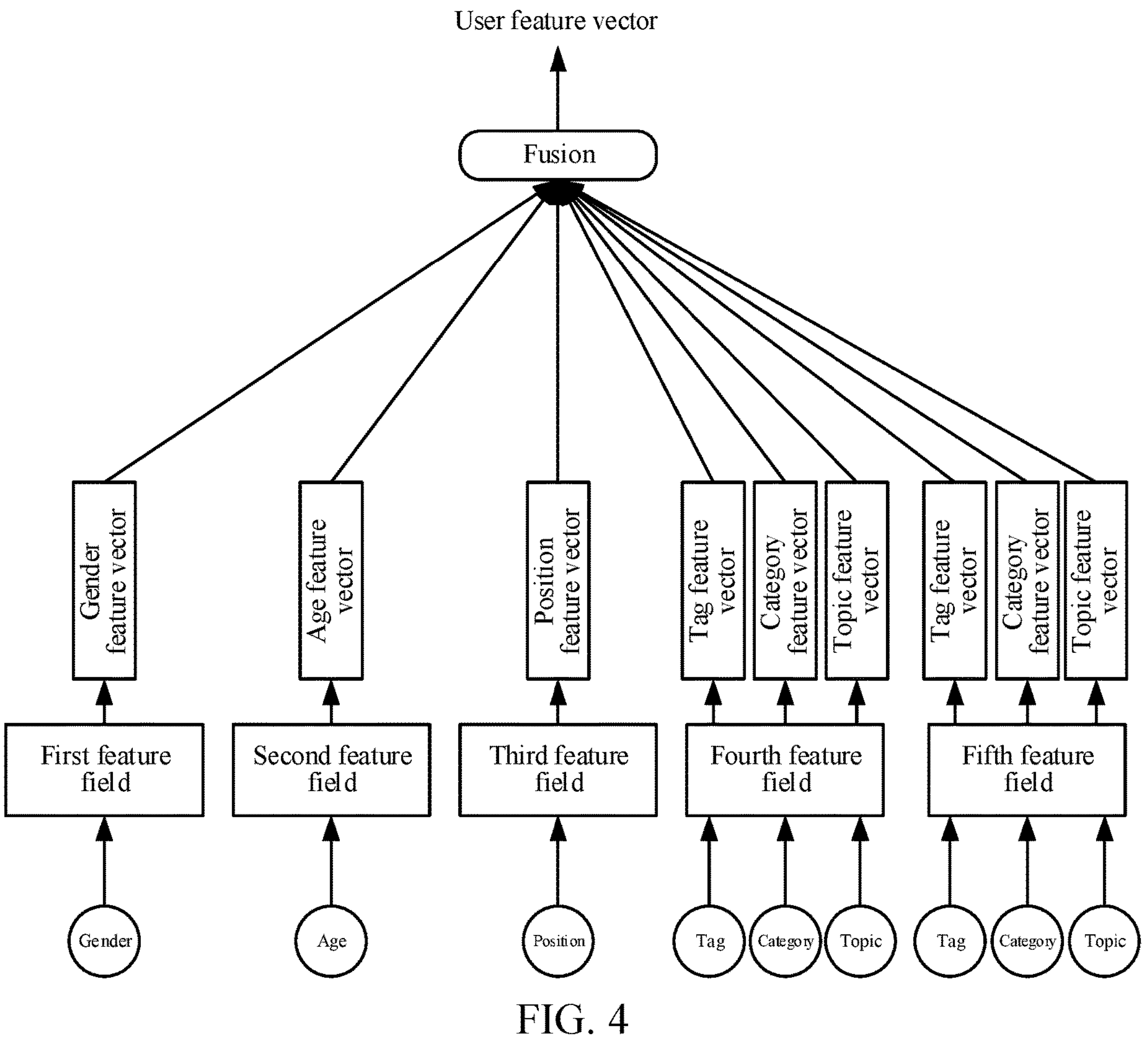
FIG. 4 is a schematic flowchart of a method for obtaining a user feature vector according to embodiment(s) of the present disclosure.

Exemplarily, as shown in FIG. 4, five feature fields are preset, namely, a first feature field to a fifth feature field, where the gender is a user feature in the first feature field, the age is a user feature in a second feature field, the position is a user feature in a third feature field, a tag, a category, and a topic are obtained from the historical behavior data of the video application A as user features in a fourth feature field, and a tag, a category, and a topic are obtained from the historical behavior data of the audio application B as user features in the fifth feature field.

Feature vectors of user features in each feature field are extracted, where the feature vector in the first feature field is a gender feature vector, the feature vector in the second feature field is an age feature vector, the feature vector in the third feature field is a position feature vector, the feature vectors in the fourth feature field include a tag feature vector, a category feature vector, and a topic feature vector, and the feature vectors in the fifth feature field include a tag feature vector, a category feature vector, and a topic feature vector.

Weighted summation is performed on the gender feature vector of the first feature field, the age feature vector of the second feature field, the position feature vector of the third feature field, the tag feature vector, the category feature vector, and the topic feature vector of the fourth feature field, and the tag feature vector, the category feature vector, and the topic feature vector of the fifth feature field, to obtain the user feature vector of the target user. A weight corresponding to each feature vector is obtained by using the attention mechanism during the training of the user portrait model.

The feature vectors of the target user in the plurality of feature fields are fused to obtain the user feature vector, so that the user feature vector can represent the user feature more comprehensively, thereby further effectively improving the accuracy of matching the user tag based on the user feature vector.

In step 202, when the tag feature vectors of the content tags of the multimedia content are obtained, content tags of each piece of multimedia content of the multimedia content in the target application in a plurality of tag fields are first determined, and tag feature vectors of content tags in each tag field are extracted by using the user portrait model.

The tag field is a tag dimension representing the multimedia content, different tag fields represent different tag dimensions, and user tags in various tag fields may be different or partially the same. The tag field may be a content tag field, a category tag field, a topic tag field, an official account tag field, and the like. Embedding processing is performed on the content tags in each tag field by using the user portrait model, to obtain tag feature vectors of the content tags in each tag field.

Exemplarily, five tag fields are preset, namely, a content tag field, a first-class category tag field, a second-class category tag field, a topic tag field, and an official account tag field.

Using a sports news article in the target application as an example, the sports news article is set to describe a football match with teams M and N. Content tags obtained from the news article include: sports, football, Team M, and Team N, and the obtained content tags are used as tags in the content tag field. A first-class category corresponding to the news article is sports, and a content tag "sports" is used as a tag in the first-class category tag field. A second-class category corresponding to the news article is football, and a content tag "football" is used as a tag in the second-class category tag field. The content of the news article is football match, and a content tag "football" is used as a tag in the topic tag field. The news article sources from Q Sports official account, and "Q Sports official account" is used as a tag in the official account tag field. Content tags of other multimedia content in various tag fields may also be determined in the same manner, which is not repeated herein.

In this embodiment of the present disclosure, a plurality of tag fields may be preset to represent tags in the multimedia content, to subsequently match content tags of a plurality of dimensions for the target user, thereby improving the accuracy of the user portrait.

Tag field division is not limited to one of the implementations described above, and the implementation may be a combination of some tag fields of the content tag field, the category tag field, the topic tag field, and the official account tag field. This is not limited in the present disclosure. In addition, in the present disclosure, content tags may be directly obtained from the multimedia content without setting the tag field, and feature extraction is performed on the content tags of the multimedia content, to determine the tag feature vectors of the content tags. This is not limited in the present disclosure.

In this embodiment of the present disclosure, after the user feature vector of the target user and the tag feature vectors of the content tags of the multimedia content in the target application are obtained, an alternative tag of the target user is determined in the following manner: determining similarities between the user feature vector of the target user and tag feature vectors of content tags in each tag field, and determining a content tag of the multimedia content in a plurality of tag fields whose similarity meets a preset condition as the alternative tag of the target user.

In certain embodiment(s), the similarity between the user feature vector of the target user and the tag feature vector of the content tag may be a dot product value, a Euclidean distance, and a cosine similarity between the user feature vector and the tag feature vector.

In certain embodiment(s), a similarity threshold may be preset, and the same or different similarity thresholds may be set for different tag fields. This is not limited in the present disclosure. For each tag field, similarities between the user feature vector of the target user and tag feature vectors of content tags in such a tag field are determined, and a content tag in the tag field whose similarity is greater than the similarity threshold as the alternative tag of the target user.

In certain embodiment(s), a tag quantity threshold may be preset, and the same or different tag quantity thresholds may be set for different tag fields. This is not limited in the present disclosure. For each tag field, similarities between the user feature vector of the target user and tag feature vectors of each content tag in the tag field, content tags in the tag field are sorted in descending order of the similarity, and content tags sorted top W are determined as alternative tags of the target user, where W is the tag quantity threshold corresponding to the tag field.

In this embodiment of the present disclosure, a plurality of tag fields are preset to represent the content tags in the multimedia content, and the alternative tags of the target user are obtained from the content tags in each tag field based on the similarities between the user feature vector of the target user and tag feature vectors of content tags in each tag field, so that the obtained alternative tags are also multi-dimensional, the obtained user portrait is more comprehensive, and more accurate content may be recommended to users based on the multi-dimensional user portrait subsequently.

A process of training the user portrait model is described in detail below. The training process may be performed by a computing device, where the computing device may be the terminal device 101 or the server 102 shown in FIG. 1, and the training includes the following steps: performing iterative training for a plurality of times by using a to-be-trained user portrait model and a training sample, to obtain a user portrait model, the training sample including sample multimedia content and user features of a sample user, each iterative training process including: extracting feature vectors of the user features of the sample user and tag feature vectors of content tags of the sample multimedia content; performing hierarchical embedding processing on the feature vectors of the user features of the sample user, to obtain a user feature vector of the sample user; and performing hierarchical embedding processing on the tag feature vectors to obtain a content feature vector of the sample multimedia content, and adjusting a parameter of the to-be-trained user portrait model based on a degree of association between the user feature vector of the sample user and the content feature vector of the sample multimedia content.

Figure 5:
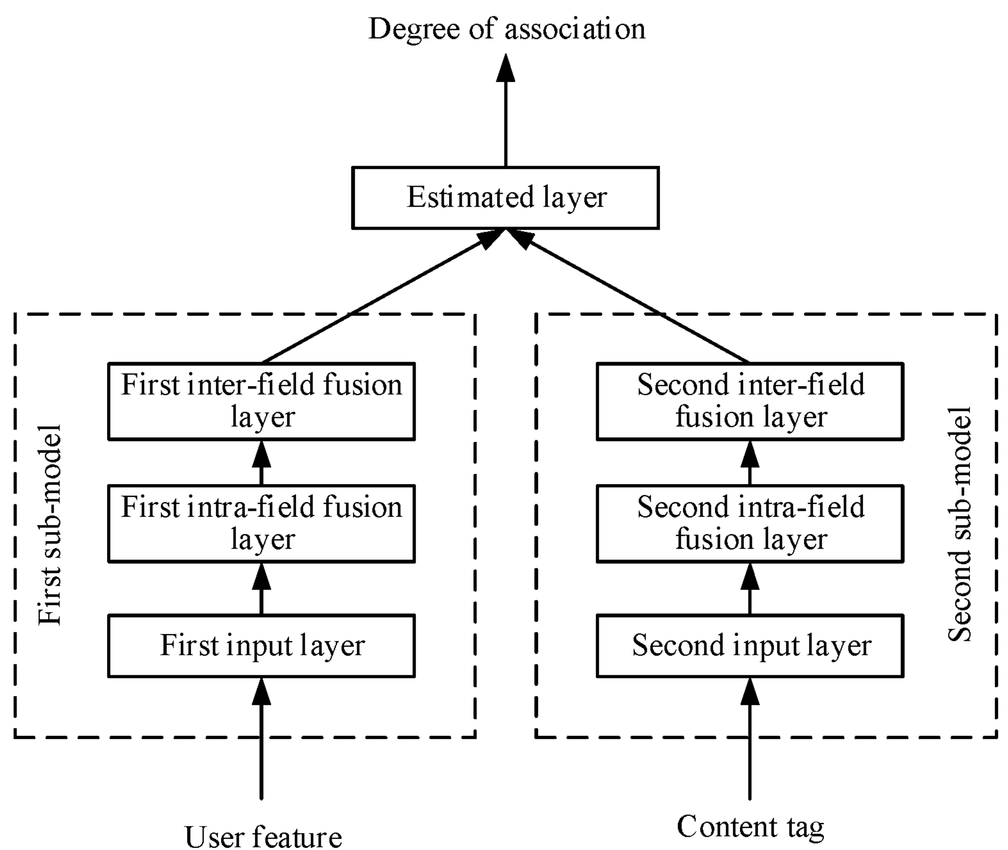
FIG. 5 is a schematic structural diagram of a user portrait model according to embodiment(s) of the present disclosure.

The structure and training manners of the user portrait model include at least the following:

In a first implementation, as shown in FIG. 5, the user portrait model includes a first sub-model, a second sub-model, and an estimated layer, where the first sub-model includes a first input layer, a first intra-field fusion layer, and a first inter-field fusion layer, and the second sub-model includes a second input layer, a second intra-field fusion layer, and a second inter-field fusion layer.

During the training of the user portrait model, for the first sub-model, user features of a sample user in a plurality of feature fields are first determined according to attribute information and historical behavior data of the sample user, and the user features of the sample user in the plurality of feature fields are inputted into the to-be-trained first sub-model through the first input layer. The first input layer performs feature extraction on user features of the sample user in each feature field, obtains feature vectors of the user features in each feature field, and inputs the feature vectors of the user features into the first intra-field fusion layer. The first intra-field fusion layer fuses the feature vectors of the user features in each feature field to obtain an intra-field feature vector of each feature field, and inputs the intra-field feature vector of each feature field into the first inter-field fusion layer. The first inter-field fusion layer fuses intra-field feature vectors of the plurality of feature fields to obtain a user feature vector of the sample user, and inputs the user feature vector of the sample user into the estimated layer. In certain embodiment(s), weighted summation or direct addition may be performed when or in response to determining that the feature vectors of the user features in each feature field are fused to obtain an intra-field feature vector of each feature field. Weighted summation or direct addition may be performed when or in response to determining that intra-field feature vectors of the plurality of feature fields are fused to obtain a user feature vector of the sample user.

For the second sub-model, content tags of sample multimedia content in a target application in a plurality of tag fields are first determined, and the content tags of the sample multimedia content in the plurality of tag fields are inputted into the to-be-trained second sub-model through the second input layer. The second input layer extracts tag feature vectors of content tags in each tag field, and inputs the tag feature vectors of the content tags in each tag field into the second intra-field fusion layer. The second intra-field fusion layer fuses the tag feature vectors of the content tags in each tag field to obtain an intra-field tag vector of each tag field, and inputs the intra-field tag vector of each tag field into the second inter-field fusion layer. The second inter-field fusion layer fuses intra-field tag vectors of the plurality of tag fields to obtain a content feature vector of the sample multimedia content, and inputs the content feature vector of the sample multimedia content into the estimated layer. In certain embodiment(s), weighted summation or direct addition may be performed when or in response to determining that the tag feature vectors of the content tags in each tag field are fused to obtain an intra-field tag vector of each tag field. Weighted summation or direct addition may be performed when or in response to determining that intra-field tag vectors of the plurality of tag fields are fused to obtain a content feature vector of the sample multimedia content.

The estimated layer is configured to estimate a degree of association between the sample user and the sample multimedia content in the target application. For example, the estimated layer may determine the degree of association between the sample user and the sample multimedia content in the target application by calculating a dot product value or a Euclidean distance or a cosine similarity between the user feature vector and the content feature vector. During the training, a loss function is defined by cross entropy, and the loss function is improved by performing adaptive moment estimation (Adam). The training ends when or in response to determining that the loss function meets a preset condition. The loss function may be shown as formula (5):

$$\text{Loss} = -\frac{1}{K} * \sum_{k=1}^{K} (\hat{y}_k \log y_k + (1-\hat{y}_k)\log(1-y_k)) \tag{5}$$

$y_k$ is a degree of association between a kth piece of sample multimedia content and the sample user estimated by the user portrait model ($0 \le y_k \le 1$), and $\widehat{y_k}$ is an actual degree of association between the kth piece of sample multimedia content and the sample user ($\widehat{y_k}$ is 0 or 1), where k is a quantity of pieces of sample multimedia content.

The estimated degree of association $y_k$ between the kth piece of sample multimedia content and the sample user may be determined by using the following formula (6):

$$y_k = \frac{1}{1 + e^{-\vec{e}\,\vec{t_k}}} \tag{6}$$

$\vec{t}_k$ is a content feature vector of the kth piece of sample multimedia content, and $\vec{e}$ is a user feature vector of the sample user.

Figure 6:
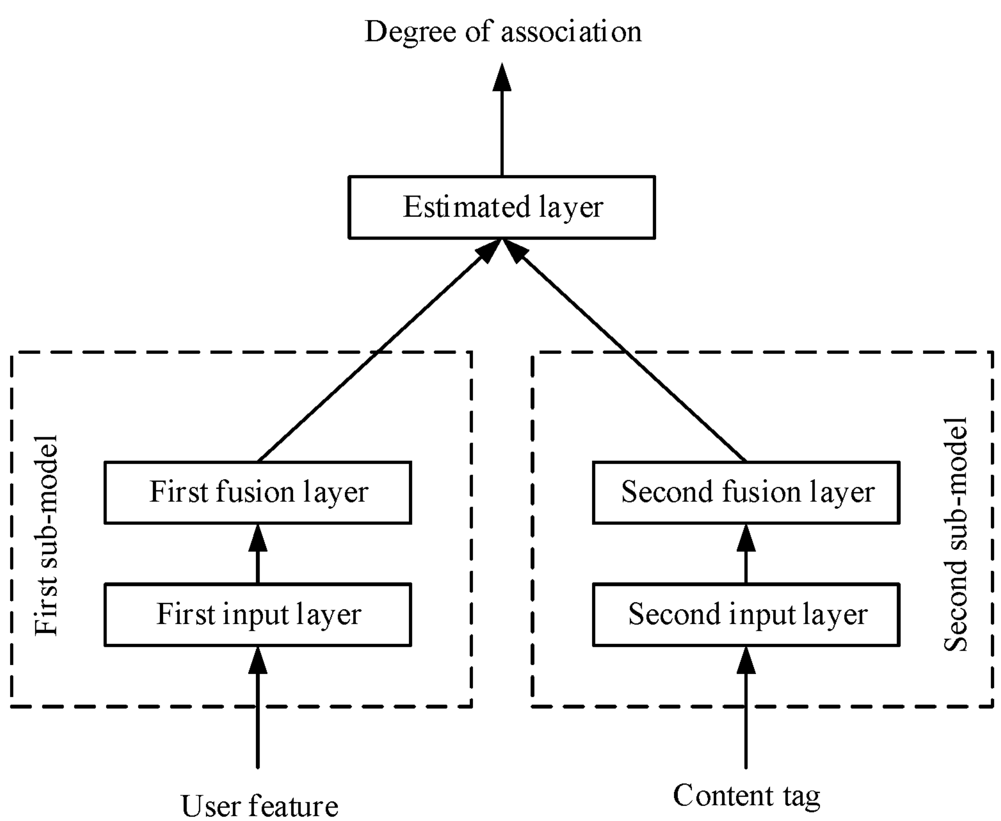
FIG. 6 is a schematic structural diagram of a user portrait model according to embodiment(s) of the present disclosure.

In a second implementation, as shown in FIG. 6, the user portrait model includes a first sub-model, a second sub-model, and an estimated layer, where the first sub-model includes a first input layer and a first fusion layer, and the second sub-model includes a second input layer and a second fusion layer.

During the training of the user portrait model, for the first sub-model, user features of a sample user in a plurality of feature fields are first determined according to attribute information and historical behavior data of the sample user, and the user features of the sample user in the plurality of feature fields are inputted into the to-be-trained first sub-model through the first input layer. The first input layer performs feature extraction on user features of the sample user in each feature field, obtains feature vectors of the user features in each feature field, and inputs the feature vectors of the user features into the first fusion layer. The first fusion layer fuses feature vectors of the user features in the plurality of feature fields to obtain a user feature vector of the sample user, and inputs the user feature vector of the sample user into the estimated layer. Fusion may be performed by using any one of weighted summation or direct addition.

For the second sub-model, content tags of sample multimedia content in a target application in a plurality of tag fields are first determined, and the content tags of the sample multimedia content in the plurality of tag fields are inputted into the to-be-trained second sub-model through the second input layer. The second input layer extracts tag feature vectors of content tags in each tag field, and inputs the tag feature vectors of the content tags in each tag field into the second fusion layer. The second fusion layer fuses tag feature vectors of the content tags in the plurality of tag fields to obtain a content feature vector of the sample multimedia content, and inputs the content feature vector of the sample multimedia content into the estimated layer. Fusion may be performed by using any one of weighted summation or direct addition.

The estimated layer is configured to estimate a degree of association between the sample user and the sample multimedia content in the target application. For example, the estimated layer may determine the degree of association between the sample user and the sample multimedia content in the target application by calculating a dot product value or a Euclidean distance or a cosine similarity between the user feature vector and the content feature vector. During the training, a loss function is defined by cross entropy, and the loss function is improved by performing Adam. The loss function is expressed by formula (5), and the training ends when or in response to determining that the loss function meets a preset condition.

In a third implementation, as shown in FIG. 6, the user portrait model includes a first sub-model, a second sub-model, and an estimated layer, where the first sub-model includes a first input layer and a first fusion layer, and the second sub-model includes a second input layer and a second fusion layer.

During the training of the user portrait model, for the first sub-model, a plurality of user features of a sample user are first determined according to attribute information and historical behavior data of the sample user, and the plurality of user features of the sample user are inputted into the to-be-trained first sub-model through the first input layer. The first input layer performs feature extraction on the plurality of user features of the sample user to obtain a plurality of feature vectors, and inputs the plurality of feature vectors into the first fusion layer. The first fusion layer fuses the plurality of feature vectors to obtain a user feature vector of the sample user, and inputs the user feature vector of the sample user into the estimated layer. Fusion may be performed by using any one of weighted summation or direct addition.

For the second sub-model, a plurality of content tags of sample multimedia content in a target application are first determined, and the plurality of content tags of the sample multimedia content are inputted into the to-be-trained second sub-model through the second input layer. The second input layer extracts a plurality of tag feature vectors of the content tags, and inputs the plurality of tag feature vectors into the second fusion layer. The second fusion layer fuses the plurality of tag feature vectors to obtain a content feature vector of the sample multimedia content, and inputs the content feature vector of the sample multimedia content into the estimated layer. Fusion may be performed by using any one of weighted summation or direct addition.

The estimated layer is configured to estimate a degree of association between the sample user and the sample multimedia content in the target application. For example, the estimated layer may determine the degree of association between the sample user and the sample multimedia content in the target application by calculating a dot product value or a Euclidean distance or a cosine similarity between the user feature vector and the content feature vector. During the training, a loss function is defined by cross entropy, and the loss function is improved by performing Adam. The loss function is expressed by formula (5), and the training ends when or in response to determining that the loss function meets a preset condition.

Figure 7:
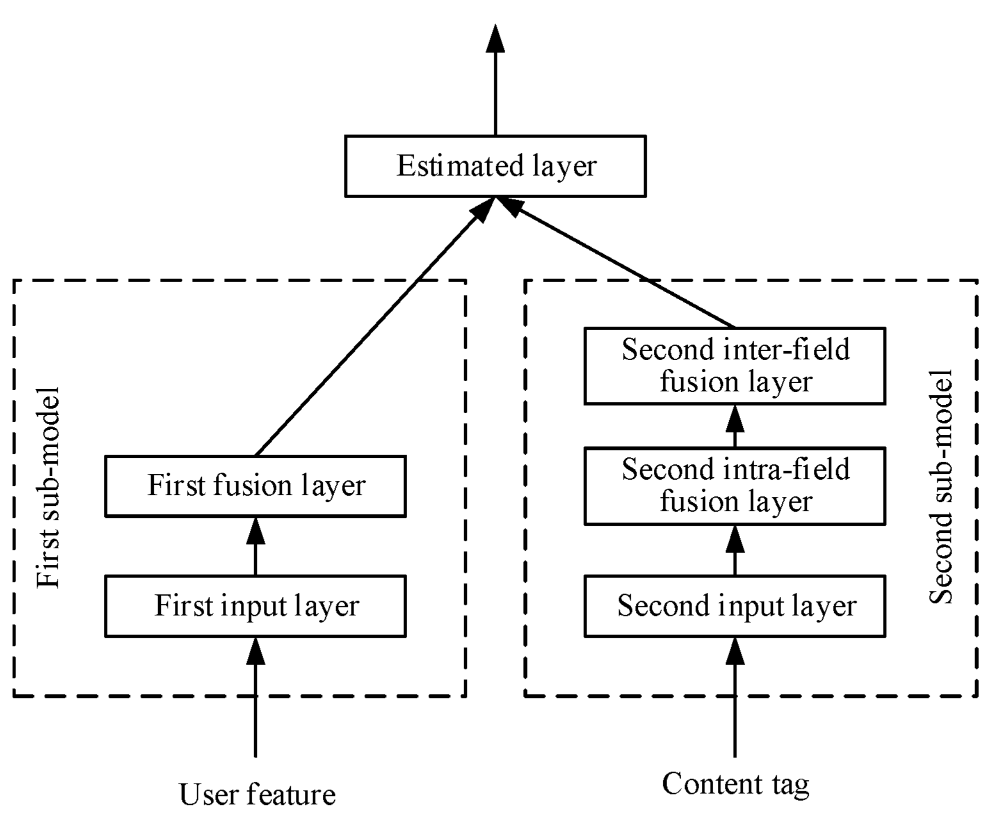
FIG. 7 is a schematic structural diagram of a user portrait model according to embodiment(s) of the present disclosure.

In a fourth implementation, as shown in FIG. 7, the user portrait model includes a first sub-model, a second sub-model, and an estimated layer, where the first sub-model includes a first input layer and a first fusion layer, and the second sub-model includes a second input layer, a second intra-field fusion layer, and a second inter-field fusion layer.

During the training of the user portrait model, for the first sub-model, a plurality of user features of a sample user are first determined according to attribute information and historical behavior data of the sample user, and the plurality of user features of the sample user are inputted into the to-be-trained first sub-model through the first input layer. The first input layer performs feature extraction on the plurality of user features of the sample user to obtain a plurality of feature vectors, and inputs the plurality of feature vectors into the first fusion layer. The first fusion layer fuses the plurality of feature vectors to obtain a user feature vector of the sample user, and inputs the user feature vector of the sample user into the estimated layer. Fusion may be performed by using any one of weighted summation or direct addition.

For the second sub-model, content tags of sample multimedia content in a target application in a plurality of tag fields are first determined, and the content tags of the sample multimedia content in the plurality of tag fields are inputted into the to-be-trained second sub-model through the second input layer. The second input layer extracts tag feature vectors of content tags in each tag field, and inputs the tag feature vectors of the content tags in each tag field into the second intra-field fusion layer. The second intra-field fusion layer fuses the tag feature vectors of the content tags in each tag field to obtain an intra-field tag vector of each tag field, and inputs the intra-field tag vector of each tag field into the second inter-field fusion layer. The second inter-field fusion layer fuses intra-field tag vectors of the plurality of tag fields to obtain a content feature vector of the sample multimedia content, and inputs the content feature vector of the sample multimedia content into the estimated layer. Both intra-field and inter-field fusion may be performed by using any one of weighted summation or direct addition.

The estimated layer is configured to estimate a degree of association between the sample user and the sample multimedia content in the target application. For example, the estimated layer may determine the degree of association between the sample user and the sample multimedia content in the target application by calculating a dot product value or a Euclidean distance or a cosine similarity between the user feature vector and the content feature vector. During the training, a loss function is defined by cross entropy, and the loss function is improved by performing adaptive moment estimation (Adam). The loss function is expressed by formula (5), and the training ends when or in response to determining that the loss function meets a preset condition.

The structure of the user portrait model in the present disclosure is not limited to the four types, but may also be another structure obtained by combining the first sub-model and the second sub-model. This is not limited in the present disclosure.

In this embodiment of the present disclosure, during the training, a content feature vector of the sample multimedia content is obtained after multi-level fusion is performed on tag feature vectors of content tags of sample multimedia content, and a user portrait model is obtained by training based on a degree of association between a user feature vector of a sample user and a content feature vector of sample multimedia content in a target application. In the model obtained by training through hierarchical embedding, instead of considering a relationship between the content tags and the user, a constraint relationship between the content tags in the sample multimedia content is considered. Therefore, during use of a model obtained through training and content tags matching the user, more accurate content tags may be matched, thereby constructing a more precise user portrait. In addition, the model is trained based on the degree of association between the user feature vector of the sample user and the content feature vector of the sample multimedia content in the target application rather than extracting tags from the sample multimedia content, and the training is performed based on a degree of association between the user feature vector of the sample user and tag vectors, so that the original distribution of sample data is maintained, and a portrait prediction result may be more accurate.

On the basis of any one of the embodiments, this embodiment of the present disclosure provides at least the following two content recommendation methods:

Implementation 1:

After a user portrait of a target user is obtained, target multimedia content recommended to the target user is determined from multimedia content of a target application based on the user portrait of the target user.

In certain embodiment(s), multimedia content matching alternative tags may be obtained from the multimedia content of the target application according to the alternative tags in the user portrait, and matched multimedia content is recommended to the target user. Since the alternative tags in the user portrait may source from different tag fields, multimedia content matching the alternative tags may be obtained from the multimedia content of the target application by using the alternative tags in different tag fields according to any practical implementation. For example, the tag field includes a content tag field, a first-class category tag field, a second-class category tag field, a topic tag field, and an official account tag field. When or in response to determining that the alternative tags in the user portrait include content tags obtained from the five tag fields, one or more target tag fields may be selected from the five tag fields, and multimedia content matching the alternative tags may be obtained from the multimedia content of the target application by using alternative tags corresponding to the target tag fields in the user portrait.

Implementation 2:

Hierarchical embedding processing is performed on tag feature vectors of content tags of each piece of multimedia content in a plurality of tag fields through the user portrait model, a content feature vector of each piece of multimedia content is determined, and target multimedia content recommended to the target user is determined from the multimedia content according to a degree of association between the user feature vector of the target user and the content feature vector of each piece of multimedia content.

In certain embodiment(s), the performing hierarchical embedding processing on tag feature vectors of content tags of each piece of multimedia content in the plurality of tag fields, to obtain a content feature vector of each piece of multimedia content that includes at least the following implementations:

In certain embodiment(s), the tag feature vectors of the content tags of the multimedia content in each tag field are fused, to obtain an intra-field tag vector of each tag field; and intra-field tag vectors of the plurality of tag fields are fused, to obtain the content feature vector of the multimedia content.

For example, the tag feature vectors of the content tags of the multimedia content in each tag field are directly added to obtain an intra-field tag vector of each tag field, and intra-field tag vectors in the plurality of tag fields are directly added to obtain the content feature vector of the multimedia content.

The method for performing intra-field fusion and inter-field fusion on the tag feature vectors of the content tags is not limited to direct addition described above, or the method of weighted summation may be adopted, where a weight of weighted summation may be obtained by learning the attention mechanism during the training of the user portrait model, and there is another method in which weighted summation is performed on one of the intra-field fusion and the inter-field fusion, and direct addition is performed on the other. This is not limited in the present disclosure.

Figure 8:
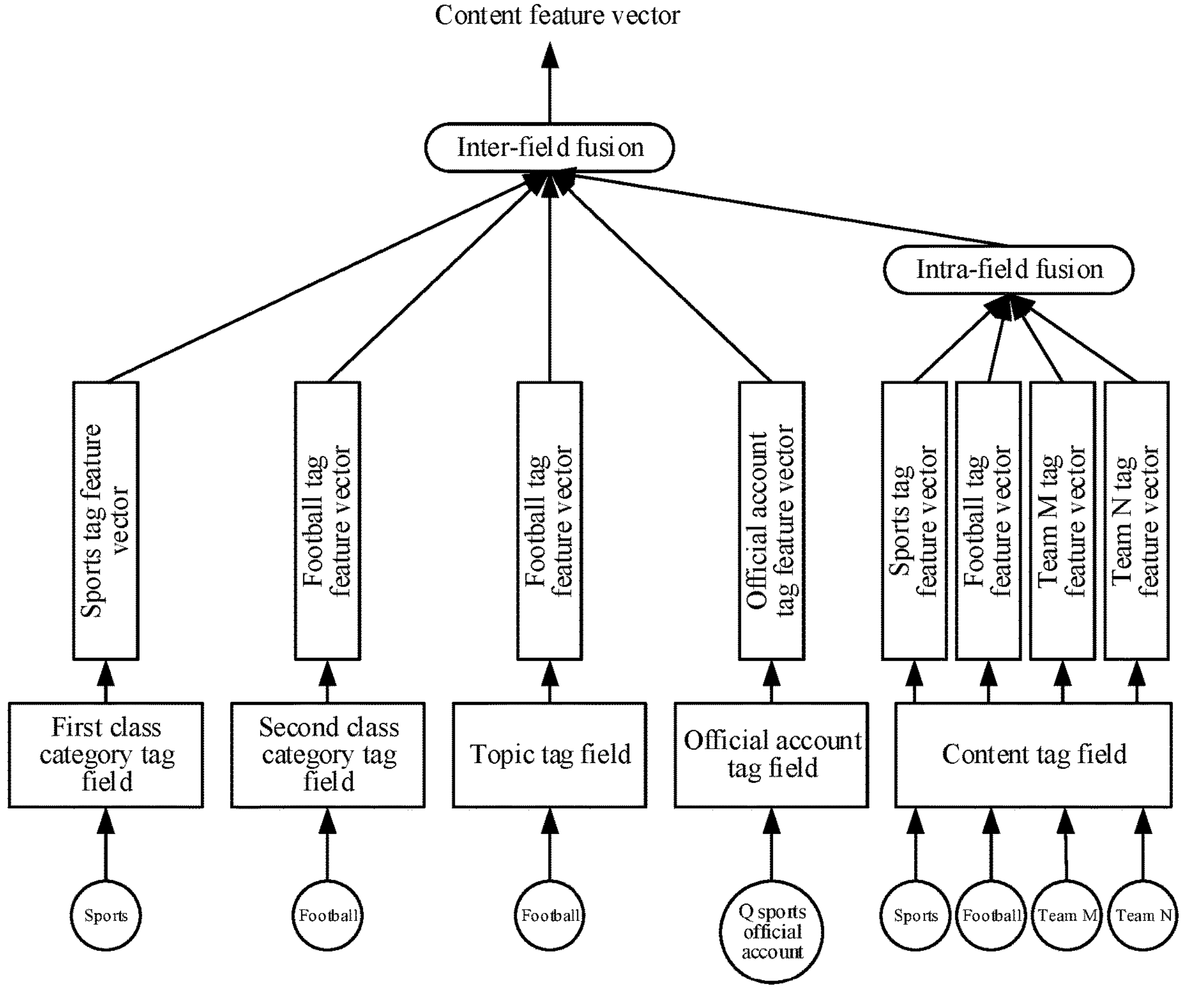
FIG. 8 is a schematic flowchart of a method for obtaining a content feature vector according to embodiment(s) of the present disclosure.

Exemplarily, as shown in FIG. 8, five tag fields are preset, namely, a content tag field, a first-class category tag field, a second-class category tag field, a topic tag field, and an official account tag field.

Using a sports news article in the target application as an example, the sports news article is set to describe a football match with teams M and N. Content tags obtained from the news article include: sports, football, Team M, and Team N, and the obtained content tags are used as tags in the content tag field. A first-class category corresponding to the news article is sports, and a content tag "sports" is used as a tag in the first-class category tag field. A second-class category corresponding to the news article is football, and a content tag "football" is used as a tag in the second-class category tag field. The content of the news article is a football match, and a content tag "football" is used as a tag in the topic tag field. The news article sources from Q Sports official account, and "Q Sports official account" is used as a tag in the official account tag field.

The tag feature vectors of the content tags in each tag field are extracted by using the user portrait model. A tag feature vector of content tags in the content tag field includes a sports tag feature vector, a football tag feature vector, a Team M tag feature vector, a Team N tag feature vector, a tag feature vector of content tags in the first-class category tag field includes a sports tag feature vector, a tag feature vector of content tags in the second-class category tag field includes a football tag feature vector, a tag feature vector of content tags in the topic tag field includes a football tag feature vector, and a tag feature vector of content tags in the official account tag field includes an official account tag feature vector.

Since the first-class category tag field, the second-class category tag field, the topic tag field, and the official account tag field only include one tag feature vector, intra-field fusion may not be performed. Tag feature vectors of four content tags in the content tag field are fused in a direct addition manner, to obtain an intra-field tag vector of the content tag field. Then, intra-field tag vectors of the content tag field, the first-class category tag field, the second-class category tag field, the topic tag field, and the official account tag field are fused in a direct addition manner, to obtain a content feature vector of the sports news article.

In certain embodiment(s), tag feature vectors of content tags of multimedia content in a plurality of tag fields are fused, to obtain the content feature vector of the multimedia content.

For example, the tag feature vectors of the content tags of the multimedia content in the plurality of tag fields are fused in a direct addition manner, to obtain the content feature vector of the multimedia content. Alternatively, the tag feature vectors of the content tags of the multimedia content in the plurality of tag fields may be fused in a weighted summation manner to obtain the content feature vector of the multimedia content, where a weight of weighted summation may be obtained by learning the attention mechanism during the training of the user portrait model.

Figure 9:
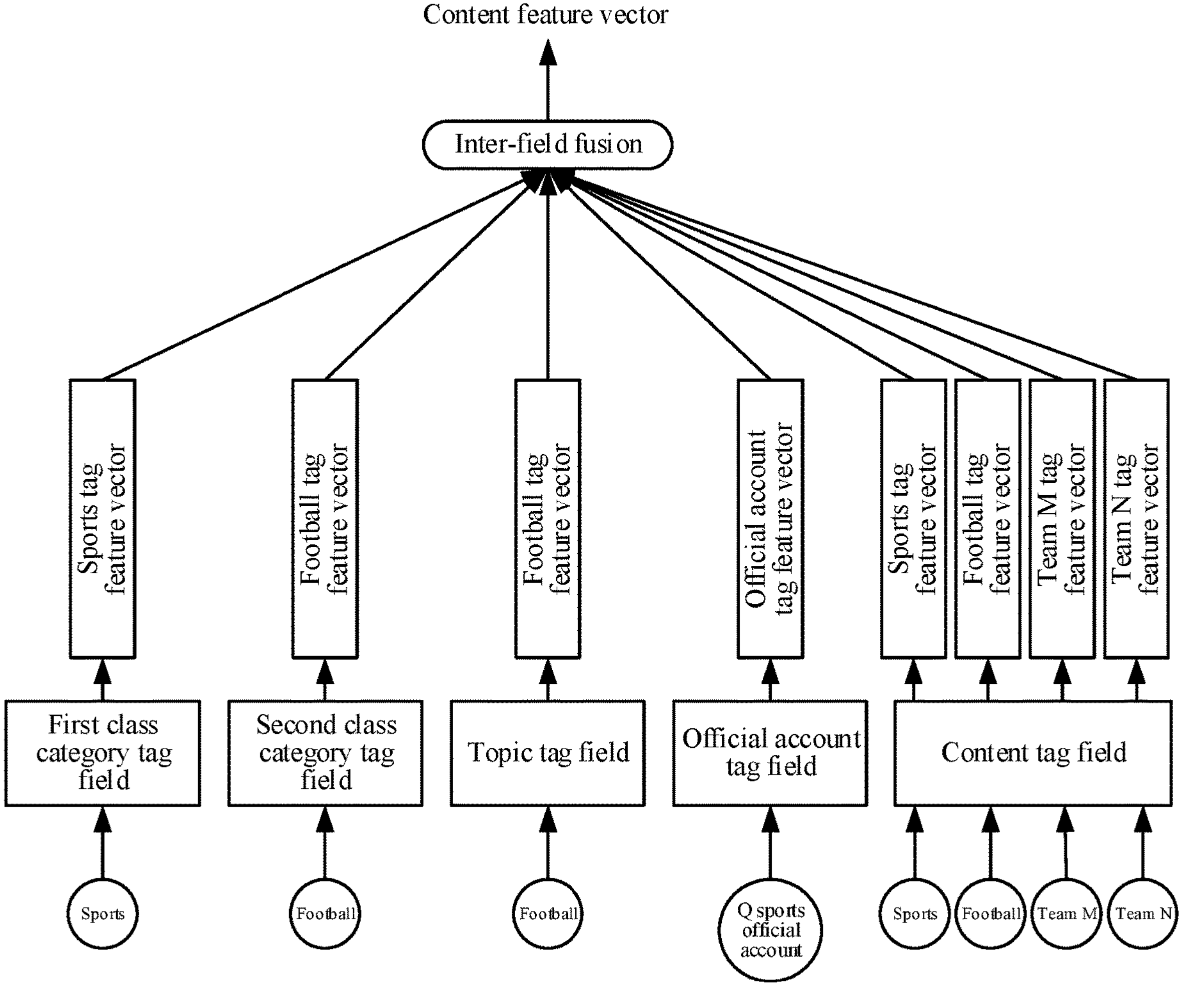
FIG. 9 is a schematic flowchart of a method for obtaining a content feature vector according to embodiment(s) of the present disclosure.

Exemplarily, as shown in FIG. 9, five tag fields are preset, namely, a content tag field, a first-class category tag field, a second-class category tag field, a topic tag field, and an official account tag field.

Using a sports news article in the target application as an example, the sports news article is set to describe a football match with teams M and N. Content tags obtained from the news article include: sports, football, Team M, and Team N, and the obtained content tags are used as tags in the content tag field. A first-class category corresponding to the news article is sports, and a content tag "sports" is used as a tag in the first-class category tag field. A second-class category corresponding to the news article is football, and a content tag "football" is used as a tag in the second-class category tag field. The content of the news article is a football match, and a content tag "football" is used as a tag in the topic tag field. The news article sources from Q Sports official account, and "Q Sports official account" is used as a tag in the official account tag field.

The tag feature vectors of the content tags in each tag field are extracted by using the user portrait model. A tag feature vector of content tags in the content tag field includes a sports tag feature vector, a football tag feature vector, a Team M tag feature vector, a Team N tag feature vector, a tag feature vector of content tags in the first-class category tag field includes a sports tag feature vector, a tag feature vector of content tags in the second-class category tag field includes a football tag feature vector, a tag feature vector of content tags in the topic tag field includes a football tag feature vector, and a tag feature vector of content tags in the official account tag field includes an official account tag feature vector.

Tag feature vectors of content tags of the content tag field, the first-class category tag field, the second-class category tag field, the topic tag field, and the official account tag field are fused in a direct addition manner, to obtain a content feature vector of the sports news article.

After a content feature vector of each piece of multimedia content is determined, target multimedia content recommended to the target user is determined from the multimedia content according to a degree of association between the user feature vector of the target user and the content feature vector of each piece of multimedia content.

In certain embodiment(s), an association threshold may be preset, when or in response to determining that a degree of association between the content feature vector of the multimedia content and the user feature vector of the target user is greater than the association threshold, the multimedia content is recommended to the target user, and recommended content is displayed in the target application. A content recommendation quantity threshold may also be preset, various pieces of multimedia content are sorted in descending order of the degree of association, and multimedia content sorted top R pieces are recommended to the target user, and recommended content is displayed in the target application, where R is the content recommendation quantity threshold.

Tag vectors of the multimedia content in the plurality of tag fields are fused, to obtain the content feature vector of the multimedia content, so that the content feature vector can represent features of the multimedia content more comprehensively, thereby improving the accuracy of obtaining the multimedia content recommended to the user based on the matching of the user feature vector and the content feature vector.

After the multimedia content recommended to the target user is determined by performing either of the two implementations, the target application displays the recommended content displayed in the target application.

Figure 10:
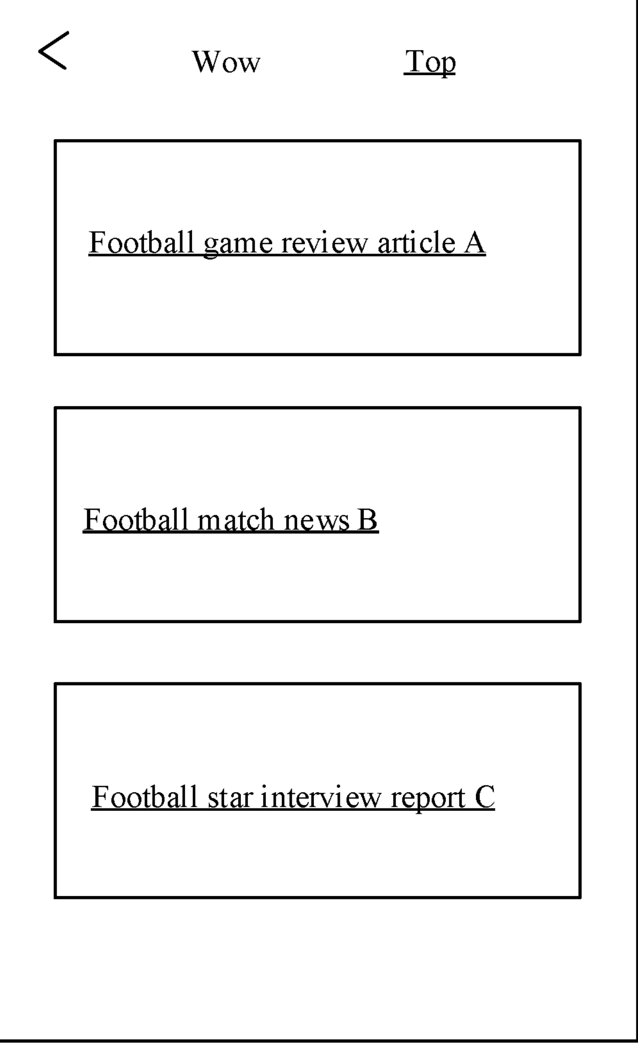
FIG. 10 is a schematic diagram of a content recommendation page according to embodiment(s) of the present disclosure.

Exemplarily, in a document recommendation scenario, as shown in FIG. 10, the target application is set as an instant messaging application, when or in response to determining that documents recommended to the target user include a football match review article A, a football match news article B, and a football star interview report C, a link of the football match review article A, a link of the football match news article B, and a link of the football star interview report C are displayed on an article reading module of the instant messaging application, and the target user may click on the links to view related articles.

Figure 11:
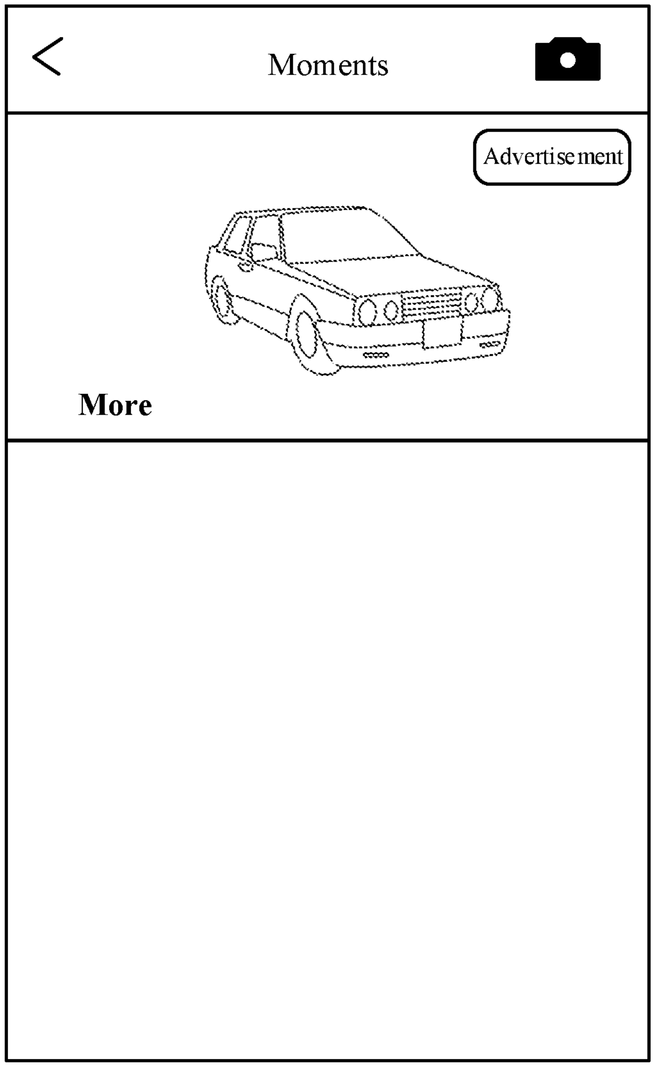
FIG. 11 is a schematic diagram of a content recommendation page according to embodiment(s) of the present disclosure.

Exemplarily, in an advertisement recommendation scenario, as shown in FIG. 11, the target application is set as an instant messaging application, when or in response to determining that an advertisement recommended to the target user is an automobile advertisement, the automobile advertisement is displayed in a circle of friends of the instant messaging application, and the target user may click on an advertisement picture to view the advertisement or enter a purchase page.

Figure 12:
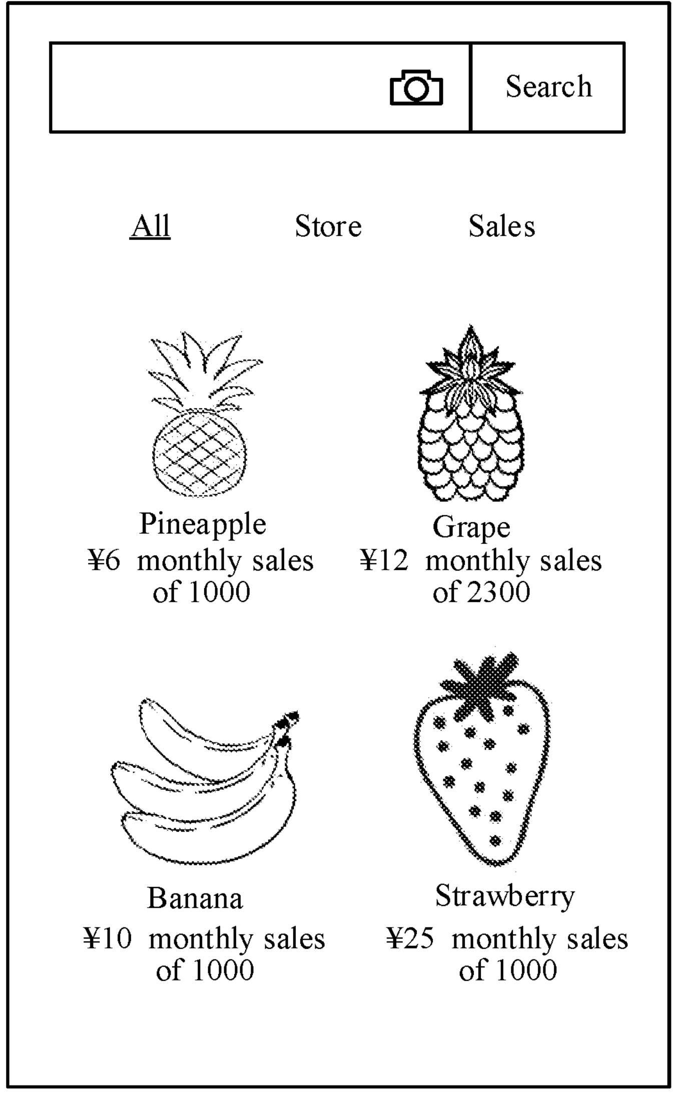
FIG. 12 is a schematic diagram of a content recommendation page according to embodiment(s) of the present disclosure.

Exemplarily, in a product recommendation scenario, as shown in FIG. 12, the target application is set as a shopping application, when or in response to determining that products determined to be recommended to the target user are "pineapple" and "grape", purchase links of "pineapple" and "grape" are preferentially displayed in a recommendation page of a fruit category in the shopping application, for example, the links of "pineapple" and "grape" are displayed on the top of the recommendation page, and purchase links of "banana" and "strawberry" are displayed at the bottom of the recommendation page.

To better illustrate the embodiments of the present disclosure, the method for obtaining a user portrait provided in the embodiments of the present disclosure is described below by using an example in which the target application is a document recommendation application, where the method is performed by a server.

Figure 13:
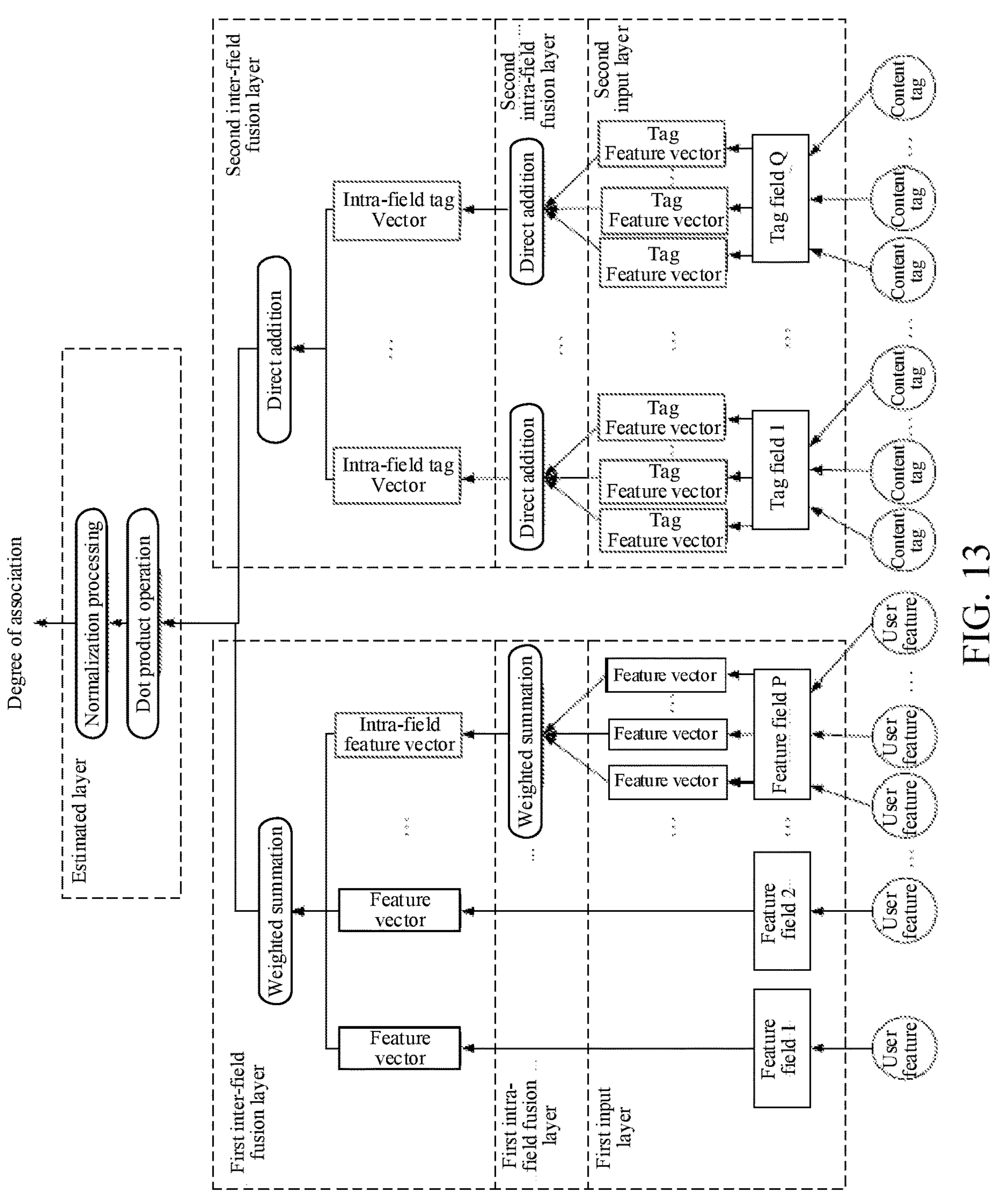
FIG. 13 is a schematic structural diagram of a user portrait model according to embodiment(s) of the present disclosure.

The structure of a user portrait model is first described. As shown in FIG. 13, the user portrait model includes a first sub-model, a second sub-model, and an estimated layer, where the first sub-model includes a first input layer, a first intra-field fusion layer, and a first inter-field fusion layer, and the second sub-model includes a second input layer, a second intra-field fusion layer, and a second inter-field fusion layer.

During the training of the user portrait model, for the first sub-model, P feature fields are preset, namely, a feature field 1, a feature field 2, . . . , and a feature field P, user features of a sample user in P feature fields are first determined according to attribute information and historical behavior data of the sample user, and the user features of the sample user in the P feature fields are inputted into the to-be-trained first sub-model through the first input layer. The first input layer performs embedding processing on user features of the sample user in each feature field, obtains feature vectors of the user features in each feature field, and inputs the feature vectors of the user features into the first intra-field fusion layer. The first intra-field fusion layer fuses the feature vectors of the user features in each feature field in a weighted summation manner to obtain an intra-field feature vector of each feature field, and inputs the intra-field feature vector of each feature field into the first inter-field fusion layer. The first inter-field fusion layer fuses intra-field feature vectors of the plurality of feature fields in a weighted summation manner to obtain a user feature vector of the sample user, and inputs the user feature vector of the sample user into the estimated layer.

For the second sub-model, Q tag fields are preset, namely, a tag field 1, a tag field 2, . . . , and a tag field Q, content tags of sample multimedia content in a target application in Q tag fields are first determined, and the content tags of the sample multimedia content in the Q tag fields are inputted into the to-be-trained second sub-model through the second input layer. The second input layer performs embedding processing on content tags in each tag field to obtain tag feature vectors of the content tags, and inputs the tag feature vectors of the content tags in each tag field into the second intra-field fusion layer. The second intra-field fusion layer fuses the tag feature vectors of the content tags in each tag field in a direct addition manner to obtain an intra-field tag vector of each tag field, and inputs the intra-field tag vector of each tag field into the second inter-field fusion layer. The second inter-field fusion layer fuses intra-field tag vectors of the plurality of tag fields in a direct addition manner to obtain a content feature vector of the sample multimedia content, and inputs the content feature vector of the sample multimedia content into the estimated layer.

The estimated layer firstly calculates a dot product value between the user feature vector of the sample user and the content feature vector of the sample multimedia content, and normalizes the dot product value by using a sigmoid function, to obtain a degree of association between the sample user and the sample multimedia content. During the training, a loss function is defined by cross entropy, and the loss function is improved by performing Adam. The loss function is expressed by formula (5), and the training ends when or in response to determining that the loss function meets a preset condition.

During construction of the user portrait of the target user, attribute information and historical behavior data of the target user are first obtained, where the attribute information of the target user includes gender, age, place, and the like, the historical behavior data includes historical behavior data of the target user in another application other than the document recommendation application, for example, a video viewing record of the target user in the video application, a document click record in the instant messaging applications, and the like. Then, user features of the target user in the P feature fields are determined according to the attribute information and the historical behavior data of the target user. Embedding processing is performed on the user features in each feature field through the trained first sub-model, to obtain the feature vectors of the user features in each feature field. The feature vectors of the user features in each feature field are fused in a weighted summation manner, to obtain an intra-field feature vector of each feature field. Then, intra-field feature vectors of the P feature fields are fused in a weighted summation manner, to determine the user feature vector of the target user.

For each piece of multimedia content of the document recommendation application, content tags of the multimedia content in Q tag fields are first determined, and embedding processing is performed on the content tags in each tag field by using the user portrait model, to obtain tag feature vectors of each content tag.

Similarities between the user feature vector of the target user and the tag feature vectors of the content tags in each tag field are determined, and a content tag corresponding to the tag feature vector whose similarity is greater than the similarity threshold is determined as the alternative tag of the target user. Then, the user portrait of the target user is determined based on the alternative tag of the target user, and a document in the document recommendation application recommended to the target user is determined based on the user portrait of the target user.

To verify the effect of the method for obtaining the user portrait in the embodiments of the present disclosure, the effect of an actual user click log on the user portrait is evaluated in the present disclosure, and an obtained evaluation result is shown in Table 1:

TABLE 1

| | Prec@1 | Prec@5 | Prec@10 |
|---|---|---|---|
| Comparison | 0.4818 | 0.3546 | 0.2985 |
| The Present Disclosure | 0.4957 | 0.3552 | 0.3018 |

Prec@N is an index of portrait estimation accuracy rate, and indicates a proportion of actual clicks of a user in the content recommended to the user based on the user portrait, which is expressed by the following formula (7):

$$\text{Prec@}N = \text{amount of content actually clicked by a user}/N \quad (7)$$

N is the amount of content recommended to the user based on the user portrait.

In this embodiment of the present disclosure, during the training, a content feature vector of the sample multimedia content is obtained after multi-level fusion is performed on tag feature vectors of content tags of sample multimedia content, and a user portrait model is obtained by training based on a degree of association between a user feature vector of a sample user and a content feature vector of sample multimedia content in a target application. In the model obtained by training through hierarchical embedding, instead of considering a relationship between the content tags and the user, a constraint relationship between the content tags in the sample multimedia content is considered. Therefore, during use of a model obtained through training and content tags matching the user, more accurate content tags may be matched, thereby constructing a more precise user portrait. In addition, the model is trained based on the degree of association between the user feature vector of the sample user and the content feature vector of the sample multimedia content in the target application rather than extracting tags from the sample multimedia content, and the training is performed based on a degree of association between the user feature vector of the sample user and tag vectors, so that the original distribution of sample data is maintained, and a portrait prediction result may be more accurate.

Figure 14:
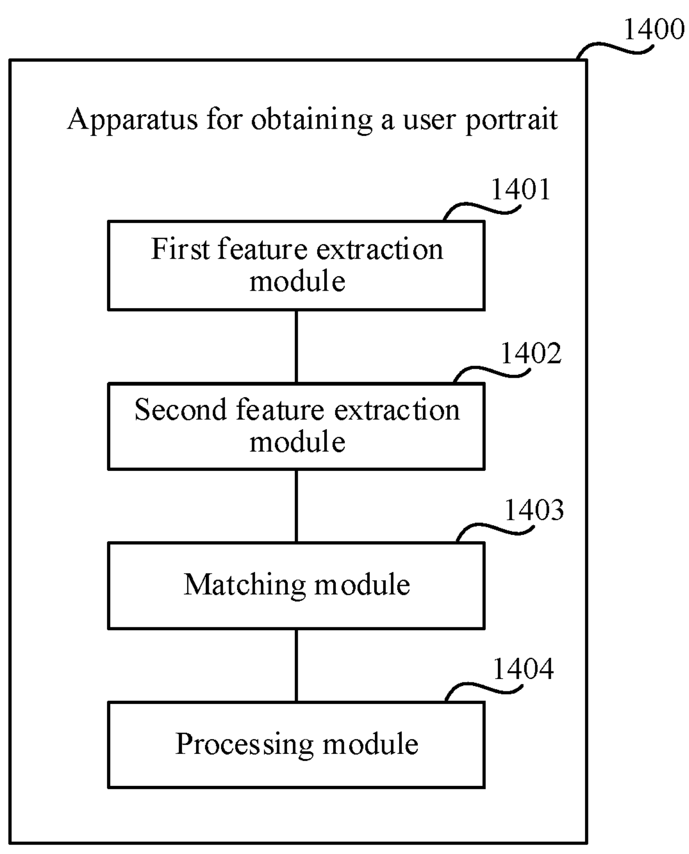
FIG. 14 is a schematic structural diagram of an apparatus for obtaining a user portrait according to embodiment(s) of the present disclosure.

Based on the same technical concept, an embodiment of the present disclosure provides a schematic structural diagram of an apparatus for obtaining a user portrait, as shown in FIG. 14, the apparatus 1400 includes: a first feature extraction module 1401, configured to determine a user feature vector of a target user according to attribute information and historical behavior data of the target user; a second feature extraction module 1402, configured to obtain tag feature vectors of content tags of multimedia content in a target application; a matching module 1403, configured to determine an alternative tag of the target user from the content tags of the multimedia content according to similarities between the user feature vector and the tag feature vectors; and a processing module 1404, configured to determine a user portrait of the target user based on the alternative tag of the target user.

In certain embodiment(s), the second feature extraction module 1402 is further configured to: determine content tags of each piece of multimedia content in the multimedia content in a plurality of tag fields; and extract tag feature vectors of content tags in each tag field through a user portrait model, the user portrait model being obtained by training based on a degree of association between a user feature vector of a sample user and a content feature vector of sample multimedia content, the content feature vector of the sample multimedia content being obtained by performing hierarchical embedding processing on tag feature vectors of content tags of the sample multimedia content, the user feature vector of the sample user being obtained by performing hierarchical embedding processing on feature vectors of user features of the sample user.

In certain embodiment(s), the second feature extraction module 1402 is further configured to: determine content tags of sample multimedia content in a plurality of tag fields, and extract tag feature vectors of content tags in each tag field; fuse the tag feature vectors of the content tags in each tag field, to obtain an intra-field tag vector of each tag field; and fuse intra-field tag vectors of the plurality of tag fields, to obtain the content feature vector of the sample multimedia content.

In certain embodiment(s), the first feature extraction module 1401 is further configured to: determine user features of the sample user in a plurality of feature fields, and extract feature vectors of user features in each feature field; fuse the feature vectors of the user features in each feature field, to obtain an intra-field feature vector of each feature field; and fuse intra-field feature vectors of the plurality of feature fields, to obtain the user feature vector of the sample user.

In certain embodiment(s), the first feature extraction module 1401 is further configured to: determine user features of the target user in a plurality of feature fields according to the attribute information and the historical behavior data of the target user; and extract feature vectors of user features in each feature field and perform hierarchical embedding processing on the feature vectors of the user features in each feature field through the user portrait model, to determine the user feature vector of the target user.

In certain embodiment(s), the first feature extraction module 1401 is further configured to: fuse the feature vectors of the user features in each feature field, to obtain an intra-field feature vector of each feature field; and fuse intra-field feature vectors of the plurality of feature fields, to obtain the user feature vector of the target user.

In certain embodiment(s), the matching module 1403 is further configured to: determine similarities between the user feature vector and the tag feature vectors of the content tags in each tag field; and determine a content tag in the content tags of the multimedia content in the plurality of tag fields whose similarity meets a preset condition as the alternative tag of the target user.

In certain embodiment(s), the processing module 1404 is further configured to: perform hierarchical embedding processing on tag feature vectors of content tags of each piece of multimedia content in the plurality of tag fields through the user portrait model, to obtain a content feature vector of each piece of multimedia content; and determine target multimedia content recommended to the target user from the multimedia content according to a degree of association between the user feature vector of the target user and the content feature vector of each piece of multimedia content.

In certain embodiment(s), the processing module 1404 is further configured to: fuse the tag feature vectors of the content tags of the multimedia content in each tag field, to obtain an intra-field tag vector of each tag field; and fuse intra-field tag vectors of the plurality of tag fields, to obtain the content feature vector of the multimedia content.

Figure 15:
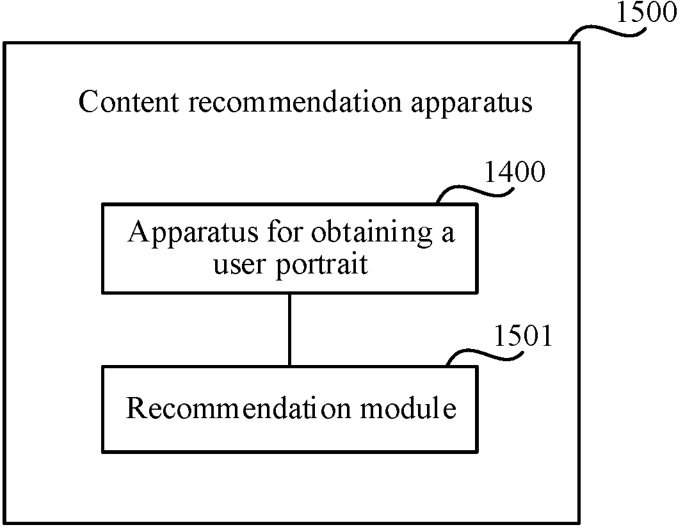
FIG. 15 is a schematic structural diagram of a content recommendation apparatus according to embodiment(s) of the present disclosure.

Based on the same technical concept, an embodiment of the present disclosure provides a schematic structural diagram of a content recommendation apparatus. As shown in FIG. 15, the apparatus 1500 includes: an apparatus 1400 for obtaining a user portrait, configured to obtain a user portrait of a target user; and a recommendation module 1501, configured to determine target multimedia content recommended to the target user from multimedia content of a target application based on the user portrait of the target user.

Figure 16:
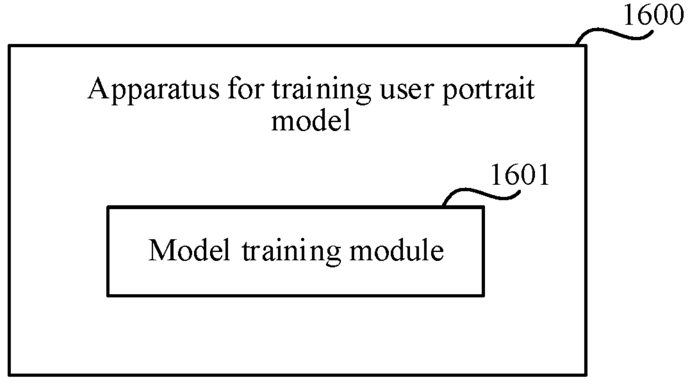
FIG. 16 is a schematic structural diagram of an apparatus for training a user portrait model according to embodiment (s) of the present disclosure.

Based on the same technical concept, an embodiment of the present disclosure provides a schematic structural diagram of an apparatus for training a user portrait model. As shown in FIG. 16, the apparatus 1600 includes: a model training module 1601, configured to perform iterative training for a plurality of times by using a to-be-trained user portrait model and a training sample, to obtain a user portrait model, the training sample including sample multimedia content and user features of a sample user, each iterative training process including: extracting feature vectors of the user features of the sample user and tag feature vectors of content tags of the sample multimedia content; performing hierarchical embedding processing on the feature vectors of the user features of the sample user, to obtain a user feature vector of the sample user; performing hierarchical embedding processing on the tag feature vectors, to obtain a content feature vector of the sample multimedia content; and adjusting a parameter of the to-be-trained user portrait model based on a degree of association between the user feature vector and the content feature vector.

In certain embodiment(s), the model training module 1601 is further configured to: determine user features of the sample user in a plurality of feature fields, and extract feature vectors of user features in each feature field; and determine content tags of the sample multimedia content in a plurality of tag fields, and extract tag feature vectors of content tags in each tag field.

In certain embodiment(s), the model training module 1601 is further configured to: fuse the tag feature vectors of the content tags in each tag field, to obtain an intra-field tag vector of each tag field; and fuse intra-field tag vectors of the plurality of tag fields, to obtain the content feature vector of the sample multimedia content.

In certain embodiment(s), the model training module 1601 is further configured to: fuse the feature vectors of the user features in each feature field, to obtain an intra-field feature vector of each feature field; and fuse intra-field feature vectors of the plurality of feature fields, to obtain the user feature vector of the sample user.

Figure 17:
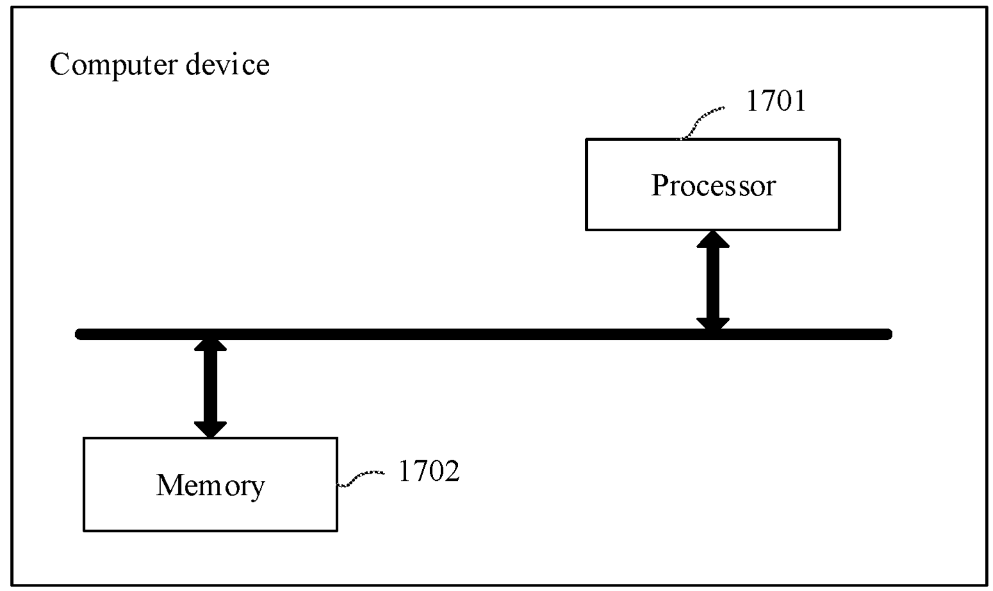
FIG. 17 is a schematic structural diagram of a computing device according to embodiment(s) of the present disclosure.

Based on the same technical concept, an embodiment of the present disclosure provides a computing device. As shown in FIG. 17, the computing device includes at least one processor 1701 and a memory 1702 connected to the at least one processor. A specific medium connecting the processor 1701 and the memory 1702 is not limited in this embodiment of the present disclosure. In FIG. 17, for example, the processor 1701 is connected to the memory 1702 through a bus. The bus may be classified into an address bus, a data bus, a control bus, or the like.

In this embodiment of the present disclosure, the memory 1702 stores instructions that are executable by the at least one processor 1701. The at least one processor 1701 may perform operations included in the method for obtaining a user portrait, the content recommendation method, and the method for training a user portrait model by executing the instructions stored in the memory 1702.

The processor 1701 is a control center of the computing device, which may be connected to various parts of a computing device by using various interfaces and lines, and by running or executing the instructions stored in the memory 1702 and invoking data stored in the memory 1702, to obtain a user portrait or recommend content or train a user portrait model. In certain embodiment(s), the processor 1701 may include one or more processing units. In certain embodiment(s), the processor 1701 may integrate an application processor and a modem processor. The application processor processes an operating system, a user interface, an application, and the like. The modem processor processes wireless communication. The modem processor may alternatively not be integrated into the processor 1701. In some embodiments, the processor 1701 and the memory 1702 may be implemented on a same chip. In some other embodiments, the processor and the memory may be separately implemented on independent chips.

The processor 1701 may be a general purpose processor, such as a central processing unit (CPU), a digital signal processor, an application-specific integrated circuit (ASIC), a field programmable gate array or another programmable logic device, a discrete gate or a transistor logic device, or a discrete hardware component, and may implement or perform the methods, steps, and logical block diagrams disclosed in the embodiments of the present disclosure. The general purpose processor may be a microprocessor, any suitable processor, or the like. Steps of the methods disclosed with reference to the embodiments of the present disclosure may be directly performed by a hardware processor, or may be performed by using a combination of hardware and a software module in the processor.

The memory 1702, as a non-transitory computer-readable storage medium, may be configured to store a non-transitory software program, a non-transitory computer-executable program and a module. The memory 1702 may include at least one type of storage medium, and the storage medium may include a flash memory, a hard disk, a multimedia card, a card type memory, a random access memory (RAM), a static random access memory (SRAM), a programmable read-only memory (PROM), a read-only memory (ROM), an electrically erasable programmable read-only memory (EEPROM), a magnetic memory, a magnetic disk, an optical disc, or the like. Alternatively, the memory 1702 is any other medium that can be used to carry or store expected program code that has an instruction or data structure form, and that can be accessed by a computer, but is not limited thereto. The memory 1702 according to this embodiment of the present disclosure may be further a circuit or any other apparatus that can implement a storage function, and is configured to store program instructions and/or data.

Based on the same inventive concept, an embodiment of the present disclosure provides a computer-readable storage medium, storing a computer program executable by a computing device, the program, when run on the computing device, causing the computing device to perform operations included in the method for obtaining a user portrait, the content recommendation method, and the method for training a user portrait model.

A person skilled in the art may understand that the embodiments of the present invention may be provided as a method or a computer program product. Therefore, the present disclosure may be in a form of hardware embodiments, software embodiments, or combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. Computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Although some exemplary embodiments of the present invention have been described, a person skilled in the art can make changes and modifications to these embodiments once learning the inventive concept. Therefore, the following claims are intended to be construed as to cover the exemplary embodiments and all changes and modifications falling within the scope of the present disclosure.

A person skilled in the art may make various modifications and variations to the present disclosure without departing from the spirit and scope of the present disclosure. In this way, the present disclosure is intended to cover the modifications and variations provided that the modifications and variations of the present disclosure fall within the scope of the claims of the present disclosure and their equivalent technologies.

What is claimed is:

1. A method for training a user portrait model, performed by a computing device, the method comprising:

obtaining the user portrait model by using a to-be-trained user portrait model and a training sample, to obtain the user portrait model, the training sample including sample multimedia content and user features of a sample user, wherein the user portrait model is obtained by:

extracting feature vectors of the user features of the sample user and tag feature vectors of content tags of the sample multimedia content;

performing hierarchical embedding processing on the feature vectors of the user features of the sample user, to obtain a user feature vector of the sample user, wherein the performing the hierarchical embedding processing on the feature vectors of the user features comprises: for each of a plurality of feature fields, fusing the feature vectors of the user features in the feature field to obtain an intra-field feature vector by summation or attention-weighted summation; and subsequent to obtaining the intra-field feature vector for each of the plurality of feature fields, fusing the intra-field feature vectors across the plurality of feature fields to obtain the user feature vector by summation or attention-weighted summation;

performing hierarchical embedding processing on the tag feature vectors, to obtain a content feature vector of the sample multimedia content;

adjusting a parameter of the to-be-trained user portrait model based on a degree of association between the user feature vector and the content feature vector, wherein the adjusting the parameter comprises minimizing a cross-entropy loss using adaptive moment estimation until a preset stop condition is met; and storing parameters of the user portrait model after the adjusting in a database of a server that provides services for a target application for subsequent use by the target application.

2. The method according to claim 1, wherein extracting the feature vectors comprises:

determining user features of the sample user in a feature field, and extracting feature vectors of user features in the feature field; and determining content tags of the sample multimedia content in each of a plurality of tag fields, and extracting tag feature vectors of content tags in each of the plurality of tag fields.

3. The method according to claim 2, wherein performing the hierarchical embedding processing on the tag feature vectors of the content tags comprises:

fusing the tag feature vectors of the content tags in each of the plurality of tag fields, to obtain an intra-field tag vector of each of the plurality of tag fields, the fusing the tag feature vectors comprising performing summation; and fusing intra-field tag vectors of the plurality of tag fields, to obtain the content feature vector of the sample multimedia content, the fusing the intra-field tag feature vectors comprising performing summation.

4. A method for obtaining a user portrait, performed by a computing device, the method comprising:

determining a user feature vector of a target user according to attribute information and historical behavior data of the target user, wherein feature vectors of user features of the target user in a plurality of feature fields are embedded in the user feature vector of the target user by intra-field fusion followed by inter-field fusion;

determining content tags of each piece of multimedia content in the multimedia content in a plurality of tag fields;

extracting tag feature vectors of content tags in each tag field through a user portrait model, the user portrait model being obtained by training based on a degree of association between a user feature vector of a sample user and a content feature vector of sample multimedia content, a cross-entropy loss being minimized using adaptive moment estimation until a preset stop condition is met during the training, the content feature vector of the sample multimedia content being obtained by performing hierarchical embedding processing on tag feature vectors of content tags of the sample multimedia content, the user feature vector of the sample user being obtained by performing hierarchical embedding processing on feature vectors of user features of the sample user, wherein the feature vectors of the user features of the sample user in the plurality of feature fields are embedded in the user feature vector of the sample user by intra-field fusion followed by inter-field fusion;

determining an alternative tag of the target user from the content tags of the multimedia content according to similarities between the user feature vector and the tag feature vectors;

determining a user portrait of the target user based on the alternative tag of the target user; and in response to determining that the target user triggers content recommendation in a target application installed in a terminal device, transmitting, from a server, multimedia content recommended to the target user according to the user portrait and causing the terminal device to display the multimedia content in the target application.

5. The method according to claim 4, wherein the content feature vector of the sample multimedia content is obtained further by:

determining content tags of the sample multimedia content in the plurality of tag fields, and extracting tag feature vectors of content tags in each tag field;

fusing the tag feature vectors of the content tags in each tag field, to obtain an intra-field tag vector of each tag field, the fusing the tag feature vectors comprising performing summation; and fusing intra-field tag vectors of the plurality of tag fields, to obtain the content feature vector of the sample multimedia content, the fusing the intra-field tag vectors comprising performing summation.

6. The method according to claim 4, wherein the user feature vector of the sample user is obtained further by:

determining user features of the sample user in the plurality of feature fields, and extracting feature vectors of user features in each feature field;

fusing the feature vectors of the user features in the feature field, to obtain an intra-field feature vector of the feature field, the fusing the feature vectors comprising performing summation or weighted summation; and fusing intra-field feature vectors of the plurality of feature fields, to obtain the user feature vector of the sample user, the fusing the intra-field feature vectors comprising performing summation or weighted summation.

7. The method according to claim 6, wherein the plurality of feature fields includes at least a first feature field that does not include historical behavior data associated with any application, and a second feature field that includes historical behavior data associated with an application.

8. The method according to claim 4, wherein determining the user feature vector comprises:

determining user features of the target user in the plurality of feature fields according to the attribute information and the historical behavior data of the target user; and extracting feature vectors of user features in each feature field and performing hierarchical embedding processing on the feature vectors of the user features in the plurality of feature fields through the user portrait model, to determine the user feature vector of the target user.

9. The method according to claim 8, wherein performing the hierarchical embedding processing on the feature vectors of the user features comprises:

fusing the feature vectors of the user features in each of the plurality of feature fields, to obtain an intra-field feature vector of each of the plurality of feature fields, the fusing the feature vectors comprising performing summation or weighted summation; and fusing intra-field feature vectors of plurality of feature fields, to obtain the user feature vector of the target user, the fusing the intra-field feature vectors comprising performing summation or weighted summation.

10. The method according to claim 4, wherein determining the alternative tag comprises:

determining similarities between the user feature vector and the tag feature vectors of the content tags in the plurality of tag fields; and determining a content tag in the content tags of the multimedia content in the plurality of tag fields whose similarity meets a preset condition as the alternative tag of the target user.

11. The method according to claim 4, further comprising:

performing hierarchical embedding processing on tag feature vectors of content tags of each piece of multimedia content in the plurality of tag fields through the user portrait model, to obtain a content feature vector of each piece of multimedia content; and determining the multimedia content recommended to the target user from the multimedia content according to a degree of association between the user feature vector of the target user and the content feature vector of each piece of multimedia content.

12. The method according to claim 11, wherein performing the hierarchical embedding processing on the tag feature vectors of the content tags comprises:

fusing the tag feature vectors of the content tags of the multimedia content in each tag field, to obtain an intra-field tag vector of each tag field, the fusing the tag feature vectors comprising performing summation; and fusing intra-field tag vectors of the plurality of tag fields, to obtain the content feature vector of the multimedia content, the fusing the intra-field tag feature vectors comprising performing summation.

13. An apparatus for obtaining user portrait, the apparatus comprising: a memory storing computer program instructions; and a processor coupled to the memory and configured to execute the computer program instructions and perform:

determining a user feature vector of a target user according to attribute information and historical behavior data of the target user, wherein feature vectors of user features of the target user in a plurality of feature fields are embedded in the user feature vector of the target user by intra-field fusion followed by inter-field fusion;

determining content tags of each piece of multimedia content in the multimedia content in a plurality of tag fields;

extracting tag feature vectors of content tags in each tag field through a user portrait model, the user portrait model being obtained by training based on a degree of association between a user feature vector of a sample user and a content feature vector of sample multimedia content, a cross-entropy loss being minimized using adaptive moment estimation until a preset stop condition is met during the training, the content feature vector of the sample multimedia content being obtained by performing hierarchical embedding processing on tag feature vectors of content tags of the sample multimedia content, the user feature vector of the sample user being obtained by performing hierarchical embedding processing on feature vectors of user features of the sample user, wherein the feature vectors of the user features of the sample user in the plurality of feature fields are embedded in the user feature vector of the sample user by intra-field fusion followed by inter-field fusion;

determining an alternative tag of the target user from the content tags of the multimedia content according to similarities between the user feature vector and the tag feature vectors;

determining a user portrait of the target user based on the alternative tag of the target user; and in response to determining that the target user triggers content recommendation in a target application installed in a terminal device, transmitting, from a server, multimedia content recommended to the target user according to the user portrait and causing the terminal device to display the multimedia content in the target application.

14. The apparatus according to claim 13, wherein the content feature vector of the sample multimedia content is obtained further by:

determining content tags of the sample multimedia content in the plurality of tag fields, and extracting tag feature vectors of content tags in each tag field;

fusing the tag feature vectors of the content tags in each tag field, to obtain an intra-field tag vector of each tag field, the fusing the tag feature vectors comprising performing summation; and fusing intra-field tag vectors of the plurality of tag fields, to obtain the content feature vector of the sample multimedia content, the fusing the intra-field tag vectors comprising performing summation.

15. The apparatus according to claim 13, wherein the user feature vector of the sample user is obtained further by:

determining user features of the sample user in the plurality of feature fields, and extracting feature vectors of user features in each feature field;

fusing the feature vectors of the user features in each of the plurality of feature fields, to obtain an intra-field feature vector of each of the plurality of feature fields, the fusing the feature vectors comprising performing summation or weighted summation; and fusing intra-field feature vectors of the plurality of feature fields, to obtain the user feature vector of the sample user, the fusing the intra-field feature vectors comprising performing summation or weighted summation.

16. The apparatus according to claim 13, wherein determining the user feature vector comprises:

determining user features of the target user in the plurality of feature fields according to the attribute information and the historical behavior data of the target user; and extracting feature vectors of user features in each feature field and performing hierarchical embedding processing on the feature vectors of the user features in the plurality of feature fields through the user portrait model, to determine the user feature vector of the target user.

17. The apparatus according to claim 16, wherein performing the hierarchical embedding processing on the feature vectors of the user features comprises:

fusing the feature vectors of the user features in each of the plurality of feature fields, to obtain an intra-field feature vector of each of the plurality of feature fields, the fusing the feature vectors comprising performing summation or weighted summation; and fusing intra-field feature vectors of the plurality of feature fields, to obtain the user feature vector of the target user, the fusing the intra-field feature vectors comprising performing summation or weighted summation.

18. The apparatus according to claim 13, wherein determining the alternative tag comprises:

determining similarities between the user feature vector and the tag feature vectors of the content tags in the plurality of tag fields; and determining a content tag in the content tags of the multimedia content in the plurality of tag fields whose similarity meets a preset condition as the alternative tag of the target user.

* * * * *